US012750495B2

(12) United States Patent
Jang

(10) Patent No.: US 12,750,495 B2
(45) Date of Patent: Sep. 29, 2026

(54) IMAGE CODING METHOD AND DEVICE BASED ON GEOMETRIC PARTITIONING MODE (GPM)

(71) Applicant: LG Electronics Inc., Seoul (KR)

(72) Inventor: Hyeongmoon Jang, Seoul (KR)

(73) Assignee: LG Electronics Inc., Seoul (KR)

(*) Notice: Subject to any disclaimer, the term of this patent is extended or adjusted under 35 U.S.C. 154(b) by 57 days.

(21) Appl. No.: 18/690,654

(22) PCT Filed: Sep. 27, 2022

(86) PCT No.: PCT/KR2022/014460
§ 371 (c)(1),
(2) Date: Oct. 7, 2024

(87) PCT Pub. No.: WO2023/055032
PCT Pub. Date: Apr. 6, 2023

(65) Prior Publication Data

US 2025/0039403 A1 Jan. 30, 2025

Related U.S. Application Data

(60) Provisional application No. 63/249,558, filed on Sep. 28, 2021.

(51) Int. Cl.
*H04N 19/159* (2014.01)
*H04N 19/119* (2014.01)
(Continued)

(52) U.S. Cl.
CPC ......... *H04N 19/159* (2014.11); *H04N 19/119* (2014.11); *H04N 19/176* (2014.11); *H04N 19/46* (2014.11); *H04N 19/70* (2014.11)

(58) Field of Classification Search
CPC .. H04N 19/159; H04N 19/119; H04N 19/176; H04N 19/46; H04N 19/70
See application file for complete search history.

(56) References Cited

U.S. PATENT DOCUMENTS 11,711,534 B2 * 7/2023 Lee ...................... H04N 19/159 375/240.26
2023/0034458 A1 * 2/2023 Chen ...................... H04N 19/70

FOREIGN PATENT DOCUMENTS

KR 10-1375891 4/2014
KR 10-2021-0087450 7/2021
(Continued)

OTHER PUBLICATIONS

Kidan et al., "EE2-3.1:GPMwithinterandintraprediction(JVET-X0166)," FVET-Y0065, JointVideoExpertsTeam (JVET}ofITU-TSG168WP3and1SO/ECJTC1/SC29,25thMeeting,byteleconference,Jan. 12-21, 2022,5 pages (Year: 2022).*
(Continued)

*Primary Examiner* — Jonathan R Messmore
(74) *Attorney, Agent, or Firm* — Fish & Richardson P.C.

(57) ABSTRACT

A method by which a decoding device decodes an image, according to the disclosure of the present document, comprises the steps of: acquiring, from a bitstream, information related to a geometric partitioning mode (GPM) for the current block; deriving partitions of the current block on the basis of partition index information within the information related to the GPM, wherein the partitions include a first geometric partition and a second geometric partition; deriving first prediction samples for the first geometric partition; deriving second prediction samples for the second geometric partition; generating prediction samples for the current block on the basis of the first prediction samples and the second prediction samples; and generating reconstructed samples on the basis of the prediction samples for the current block.

15 Claims, 16 Drawing Sheets

(51) Int. Cl.
*H04N 19/176* (2014.01)
*H04N 19/46* (2014.01)
*H04N 19/70* (2014.01)

(56) References Cited

FOREIGN PATENT DOCUMENTS

| | | | |
|---|---|---|---|
| WO | 2020/094050 | A1 | 5/2020 |
| WO | WO 2020/136365 | | 7/2020 |

OTHER PUBLICATIONS

Alibaba group, "EE2-related: A combination of CIIP and DIMD/TIMD," Joint Video Experts Team (JVET) of ITU-T SG 16 WP 3 and ISO/IEC JTC 1/SC 29, Document: JVET-W0068-v2, 23rd Meeting, by teleconference, Jul. 7-16, 2021, 6 pages.

British Broadcasting Corporation, "CE4-6: Combination of geometric partitioning and CIIP," Joint Video Experts Team (JVET)of ITU-T SG 16 WP 3 and ISO/IEC JTC 1/SC 29/WG 11, Document: JVET-Q0078, 17th Meeting: Brussels, BE, Jan. 7-17, 2020, 5 pages.

International Search Report and Written Opinion in Appln. No. PCT/KR2022/014460, mailed on Dec. 14, 2022, 8 pages (with English translation).

Coban et al, "Algorithm description of Enhanced Compression Model 2 (ECM 2)," JVET-W2025, Joint Video Experts Team (JVET) of ITU-T SG 16 WP 3 and 1S0/IEC JTC 1/SC 29, 23rd Meeting, by teleconference, Jul. 7-16, 2021, 22 pages.

Extended European Search Report in European Appln. No. 22876804.0, mailed on Jul. 18, 2025, 13 pages.

Kidani et al., "EE2-3.1: GPM with inter and intra prediction (JVET-X0166)," JVET-Y0065, Joint Video Experts Team (JVET) of ITU-T SG 16 WP 3 and 1SO/IEC JTC 1/SC 29, 25th Meeting, by teleconference, Jan. 12-21, 2022, 5 pages.

* cited by examiner

IMAGE CODING METHOD AND DEVICE BASED ON GEOMETRIC PARTITIONING MODE (GPM)

CROSS-REFERENCE TO RELATED APPLICATIONS

This application is a National Stage application under 35 U.S.C. § 371 of International Application No. PCT/KR2022/014460, filed on Sep. 27, 2022, which claims the benefit of U.S. Provisional Application No. 63/249,558, filed on Sep. 28, 2021. The disclosures of the prior applications are incorporated by reference in their entirety.

FIELD OF THE DISCLOSURE

The present document relates to image coding technology, and more specifically, to an image coding method and apparatus for deriving a prediction sample based on GPM (Geometric Partitioning Mode) in an image coding system.

RELATED ART

Recently, the demand for high resolution, high quality image/video such as 4K, 8K or more Ultra High Definition (UHD) video/image is increasing in various fields. As the video/image resolution or quality becomes higher, relatively more amount of information or bits are transmitted than for conventional video/image data. Therefore, if video/image data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual video/image, such as game images/videos, are also growing.

Therefore, a highly efficient image compression technique is required to effectively compress and transmit, store, or play high resolution, high quality video/image showing various characteristics as described above.

SUMMARY OF THE DISCLOSURE

Technical Problem

The technical problem of the present document is to provide a method and an apparatus for increasing image coding efficiency.

Another technical problem of the present document is to provide a method and apparatus for performing efficient prediction based on GPM in image coding.

Technical Solution

According to an embodiment of the present document, an image decoding method performed by a decoding apparatus is provided. The method comprises obtaining information related to a geometric partitioning mode (GPM) for a current block from a bitstream, deriving partitions of the current block based on partition index information in the information related to the GPM, wherein the partitions include a first geometric partition and a second geometric partition, deriving first prediction samples for the first geometric partition, deriving second prediction samples for the second geometric partition, generating prediction samples for the current block based on the first prediction samples and the second prediction samples and generating reconstructed samples based on the prediction samples for the current block, wherein the image decoding method further comprises determining whether an intra prediction is allowed to be applied to one of the first geometric partition or the second geometric partition, wherein the obtaining the information related to GPM comprises parsing first intra GPM flag information specifying whether the first geometric partition is coded by the intra prediction based on a determination that the intra prediction is allowed to be applied to one of the first geometric partition or the second geometric partition is allowed, and wherein based on a value of the first intra GPM flag information being equal to 1, an inter prediction is applied to the second geometric partition.

According to an embodiment of the present document, an image encoding method performed by an encoding apparatus is provided. The method comprises deriving partitions for applying geometric partitioning mode (GPM) for a current block, wherein the partitions include a first geometric partition and a second geometric partition, deriving first prediction samples for the first geometric partition, deriving second prediction samples for the second geometric partition, generating prediction samples for the current block based on the first prediction samples and the second prediction samples, generating information related to the GPM for the current block and encoding image information including the information related to the GPM, wherein the image encoding method further comprises determining whether an intra prediction is allowed to be applied to one of the first geometric partition or the second geometric partition, wherein based on a determination that the intra prediction is allowed to be applied to one of the first geometric partition or the second geometric partition, the information related to the GPM includes first intra GPM flag information specifying whether the first geometric partition is coded by the intra prediction, and wherein based on a value of the first intra GPM flag information being equal to 1, an inter prediction is applied to the second geometric partition.

According to an embodiment of the present document, a computer-readable digital storage medium storing encoded video/image information generated based on the video/image encoding method disclosed in at least one of the embodiments of the present document is provided.

According to an embodiment of the present document, a computer-readable digital storage medium on which encoded information or encoded video/image information is stored that causes a decoding apparatus to perform a video/image decoding method disclosed in at least one of the embodiments of the present document is provided.

According to an embodiment of the present document, a transmission method and a transmitting apparatus for a bitstream generated based on a video/image encoding method disclosed in at least one of the embodiments of the present document.

Effects of the Disclosure

According to an embodiment of this document, overall video/image compression efficiency can be improved.

According to an embodiment of this document, prediction performance can be improved by allowing intra prediction, unlike the conventional method of only allowing inter prediction when applying GPM.

According to an embodiment of this document, prediction performance can be improved by allowing intra prediction modes of various angles (or directions) in GPM mode.

According to an embodiment of this document, the number of bits can be reduced and coding efficiency and prediction performance can be improved by preventing signaling/parsing of information that is not required to be signaled/parsed in relation to the GPM mode.

According to one embodiment of this document, it is possible to prevent the application of intra mode to both 2 partitions that are partitioned to apply GPM mode.

According to an embodiment of this document, the number of bits can be reduced and coding efficiency can be improved by inducing the intra mode on the decoder side without signaling/parsing information indicating the prediction mode.

DESCRIPTION OF EXEMPLARY EMBODIMENTS

Figure 1:
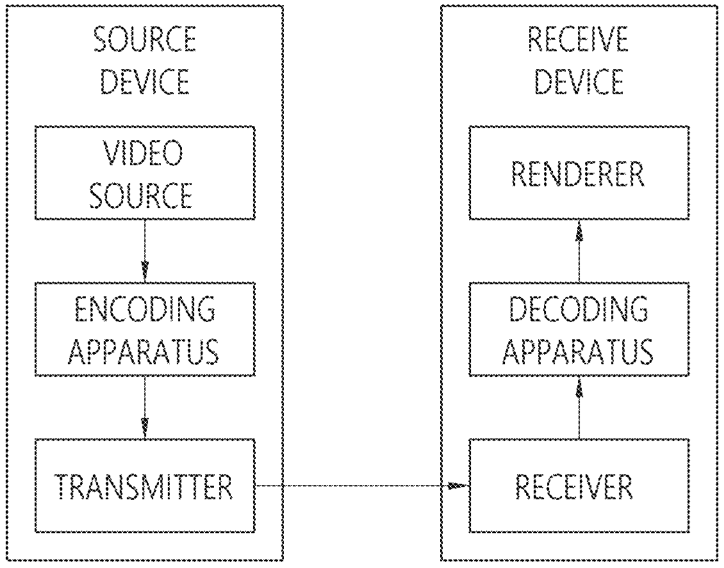
FIG. 1 schematically illustrates an example of a video/image coding system to which embodiments of the present document are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Present disclosure relates to video/image coding. For example, the methods/embodiments disclosed in the present disclosure may be related to the versatile video coding (VVC) standard (ITU-T Rec. H.266), the next-generation video/image coding standard after VVC, or other video coding related standards (for example, the High Efficiency Video Coding (HEVC) standard (ITU-T Rec. H.265), essential video coding (EVC) standard, AVS2 standard, etc.).

Present disclosure relates to video/image coding. For example, the methods/embodiments disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2), or the next generation video/image coding standard (e.g., H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, ‘sample’ may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, “A or B” may mean “only A”, “only B” or “both A and B”. In other words, in the present specification, “A or B” may be interpreted as “A and/or B”. For example, “A, B or C” herein means “only A”, “only B”, “only C”, or “any and any combination of A, B and C”.

A slash (/) or a comma (comma) used in the present description may mean “and/or”. For example, “A/B” may mean “A and/or B”. Accordingly, “A/B” may mean “only A”, “only B”, or “both A and B”. For example, “A, B, C” may mean “A, B, or C”.

In the present description, “at least one of A and B” may mean “only A”, “only B”, or “both A and B”. In addition, in the present description, the expression “at least one of A or B” or “at least one of A and/or B” may be interpreted the same as “at least one of A and B”.

In addition, in the present description, “at least one of A, B and C” means “only A”, “only B”, “only C”, or “any combination of A, B and C”. Also, “at least one of A, B or C” or “at least one of A, B and/or C” may mean “at least one of A, B and C”.

In addition, parentheses used in the present description may mean “for example”. Specifically, when “prediction (intra prediction)” is indicated, “intra prediction” may be proposed as an example of “prediction”. In other words, “prediction” in the present description is not limited to “intra prediction”, and “intra prediction” may be proposed as an example of “prediction”. Also, even when “prediction (ie, intra prediction)” is indicated, “intra prediction” may be proposed as an example of “prediction”.

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

FIG. 1 schematically illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
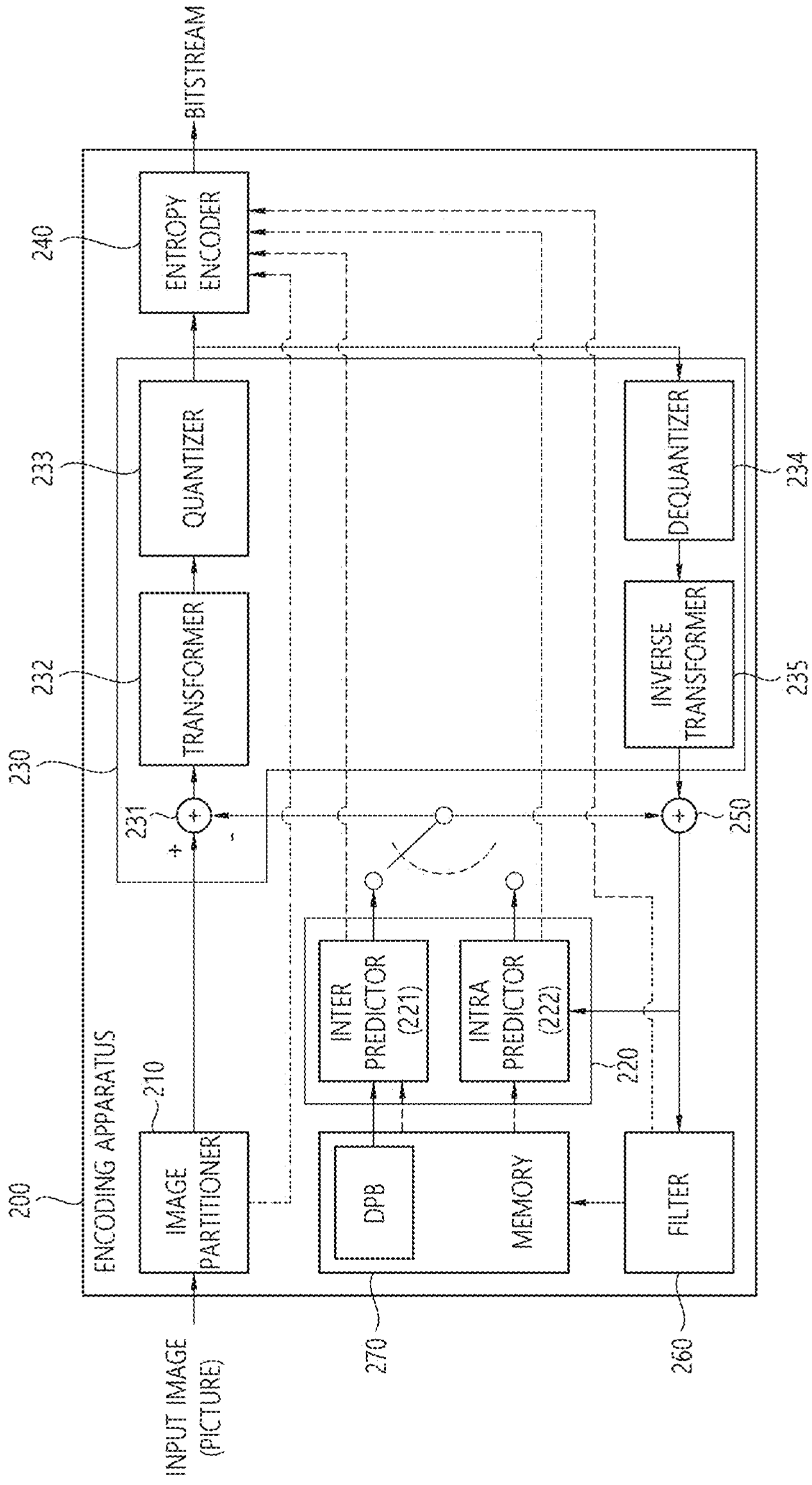
FIG. 2 is a schematic diagram illustrating a configuration of a video/image encoding apparatus to which the embodiment(s) of the present document may be applied.

FIG. 2 is a schematic diagram illustrating a configuration of a video/image encoding apparatus to which the present document may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding process according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a process of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the subtractor 231, a prediction signal (predicted block, prediction samples or prediction sample array) output from the predictor 220 is subtracted from an input image signal (original block, original samples or original sample array) to generate a residual signal (residual block, residual samples or residual sample array), and the generated residual signal is transmitted to the transformer 232. The predictor 220 may perform prediction on a block to be processed (hereinafter, referred to as a current block) and generate a predicted block including prediction samples for the current block. The predictor 220 may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) prediction mode. The IBC, for example, may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure.

The prediction signal generated by the inter predictor 221 and/or the intra predictor 222 may be used to generate a reconstructed signal or to generate a residual signal. The transformer 232 may generate transform coefficients by applying a transform technique to the residual signal. For example, the transform technique may include a discrete cosine transform (DCT), a discrete sine transform (DST), a graph-based transform (GBT), or a conditionally non-linear transform (CNT), etc. Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NAL (network abstraction layer) unit in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements to be described later may be encoded through the above-described encoding process and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed sample array). If there is no residual for the block to be processed, such as a case where the skip mode is applied, the predicted block may be used as the reconstructed block. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset (SAO), an adaptive loop filter, a bilateral filter, and the like. The filter 260 may generate various information related to the filtering and transmit the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as the reference picture in the inter predictor 260. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
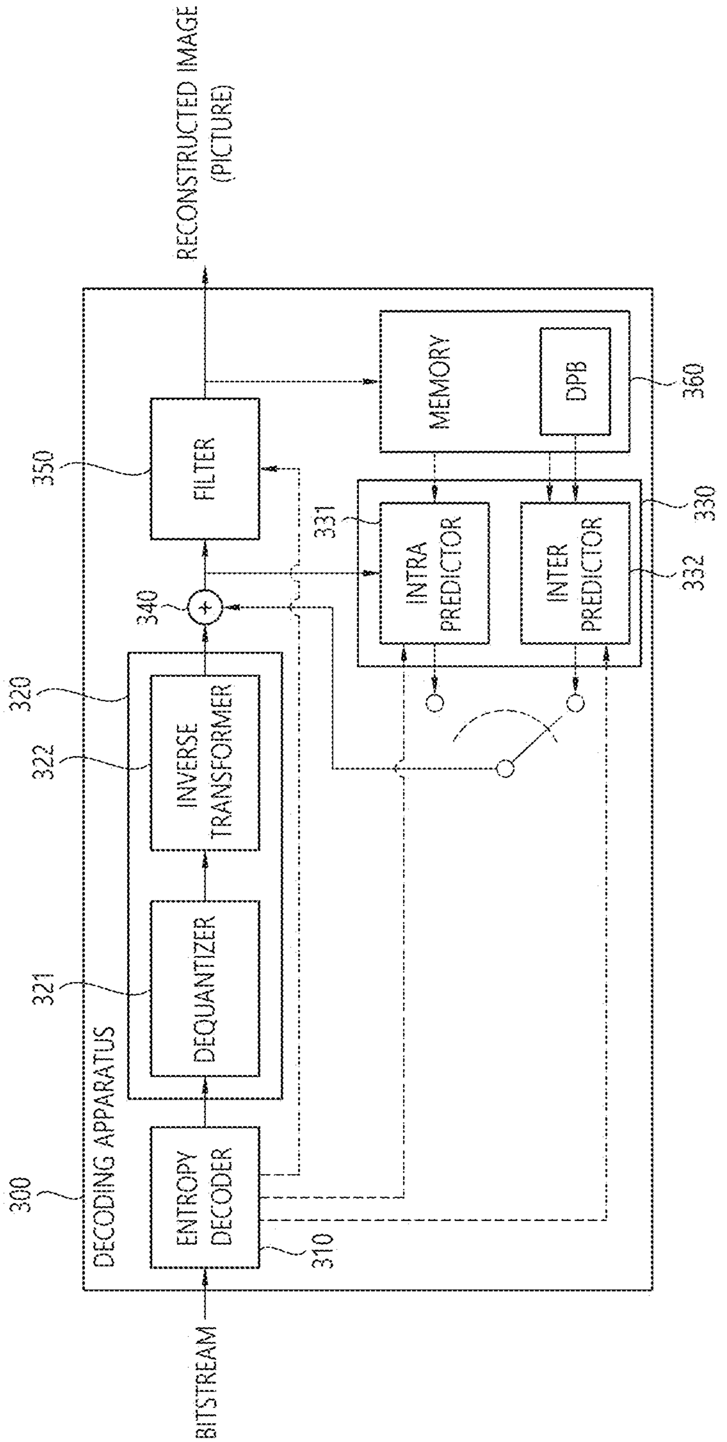
FIG. 3 is a schematic diagram illustrating a configuration of a video/image decoding apparatus to which the embodiment(s) of the present document may be applied.

FIG. 3 is a schematic diagram illustrating a configuration of a video/image decoding apparatus to which the present document may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 333 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding process and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding was performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The IBC may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure The intra predictor 332 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 332 may determine the prediction mode applied to the current block by using a prediction mode applied to a neighboring block.

The inter predictor 331 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 331 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture that have already been reconstructed. The stored motion information may be transmitted to the inter predictor 331 so as to be utilized as the motion information of the spatial neighboring block or the motion information of the temporal neighboring block. The memory 360 may store reconstructed samples of reconstructed blocks in the current picture and transfer the reconstructed samples to the intra predictor 332.

In this specification, the embodiments described in the predictor 330, the dequantizer 321, the inverse transformer 322, and the filter 350 of the decoding apparatus 300 may be applied to the same or correspond to the predictor 220, the dequantizer 234, the inverse transformer 235, and the filter 260 of the encoding apparatus 200 respectively.

As described above, in performing video coding, prediction is performed to increase compression efficiency. Through this, it is possible to generate a predicted block including prediction samples for the current block, which is a block to be coded. Here, the predicted block includes prediction samples in the spatial domain (or pixel domain). The predicted block is derived in the same way from an encoding apparatus and a decoding apparatus, and the encoding apparatus can increase image coding efficiency by signaling information (residual information) between the original block and the predicted block to the decoding apparatus, not the original sample value of the original block itself. The decoding apparatus can derive a residual block containing residual samples based on the above residual information, combine the above residential block with the above predicted block to create a restore block containing restoration samples, and create a restore picture containing restoration blocks.

The residual information may be generated through a transform and quantization process. For example, the encoding apparatus may derive a residual block between the original block and the predicted block, derive transform coefficients by performing the transform process on the residual samples (residual sample array) included in the residual block, derive quantized transform coefficients by performing the quantization process on the transform coefficients, and signaling related residual information (through a bitstream) to the decoding apparatus. Here, the residual information may include information such as value information, position information, transform technique, transform kernel, quantization parameter of the quantized transform coefficients, etc. The decoding apparatus may perform a dequantization/inverse transform process based on the residual information and derive residual samples (or residual blocks). The decoding apparatus may generate a reconstructed picture based on the predicted block and the residual block. The encoding apparatus may also derive a residual block by dequantizing/inverse transforming quantized transform coefficients for reference to the inter-prediction of the picture, and generate a reconstructed picture based on this.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

In this document, quantized transform coefficients and transform coefficients may be referred to as transform coefficients and scaled transform coefficients, respectively. In this case, the residual information may include information on transform coefficient(s), and the information on the transform coefficient(s) may be signaled through residual coding syntax. Transform coefficients may be derived based on the residual information (or information about the transform coefficient(s)), and scaled transform coefficients may be derived through inverse transform (scaling) of the transform coefficients. Residual samples may be derived based on an inverse transform (transform) to the scaled transform coefficients. This may be applied/expressed in other parts of this document as well.

A predictor of the encoding apparatus/decoding apparatus may derive prediction samples by performing inter prediction on a block-by-block basis. Inter prediction can be a prediction derived in a manner that is dependent on data elements (e.g., sample values or motion information) of picture(s) other than the current picture. When inter prediction is applied to the current block, a predicted block (prediction sample array) for the current block may be derived based on a reference block (reference sample array) specified by a motion vector in a reference picture indicated by a reference picture index. In this case, in order to reduce the amount of motion information transmitted in the inter-prediction mode, motion information of the current block may be predicted in units of blocks, subblocks, or samples based on correlation of motion information between neighboring blocks and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block present in the current picture and a temporal neighboring block present in the reference picture. A reference picture including the reference block and a reference picture including the temporal neighboring block may be the same or different. The temporal neighboring block may be called a collocated reference block, a collocated CU (colCU), and the like, and a reference picture including the temporal neighboring block may be called a collocated picture (colPic). For example, a motion information candidate list may be constructed based on neighboring blocks of the current block, and a flag or index information indicating which candidate is selected (used) to derive the motion vector and/or reference picture index of the current block may be signaled. Inter prediction may be performed based on various prediction modes. For example, in the case of skip mode and merge mode, motion information of a current block may be the same as motion information of a selected neighboring block. In the case of the skip mode, the residual signal may not be transmitted unlike the merge mode. In the case of a motion vector prediction (MVP) mode, a motion vector of a selected neighboring block is used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. Prediction based on the L0 motion vector may be called L0 prediction, prediction based on the L1 motion vector may be called L1 prediction, and prediction based on both the L0 motion vector and the L1 motion vector may be called Bi prediction. Here, the L0 motion vector may indicate a motion vector related to the reference picture list L0 (L0), and the L1 motion vector may indicate a motion vector related to the reference picture list L1 (L1). The reference picture list L0 may include pictures prior to the current picture in output order as reference pictures, and the reference picture list L1 may include pictures subsequent to the current picture in output order. The previous pictures may be referred to as forward (reference) pictures, and the subsequent pictures may be referred to as backward (reference) pictures. The reference picture list L0 may further include subsequent pictures in an output order as reference pictures than the current picture. In this case, the previous pictures in the reference picture list L0 may be indexed first, and the later pictures may be indexed next. The reference picture list L1 may further include, as reference pictures, pictures previous to the current picture in output order. In this case, the subsequent pictures in the reference picture list 1 may be indexed first, and the previous pictures may be indexed next. Here, the output order may correspond to a picture order count (POC) order.

Figure 4:
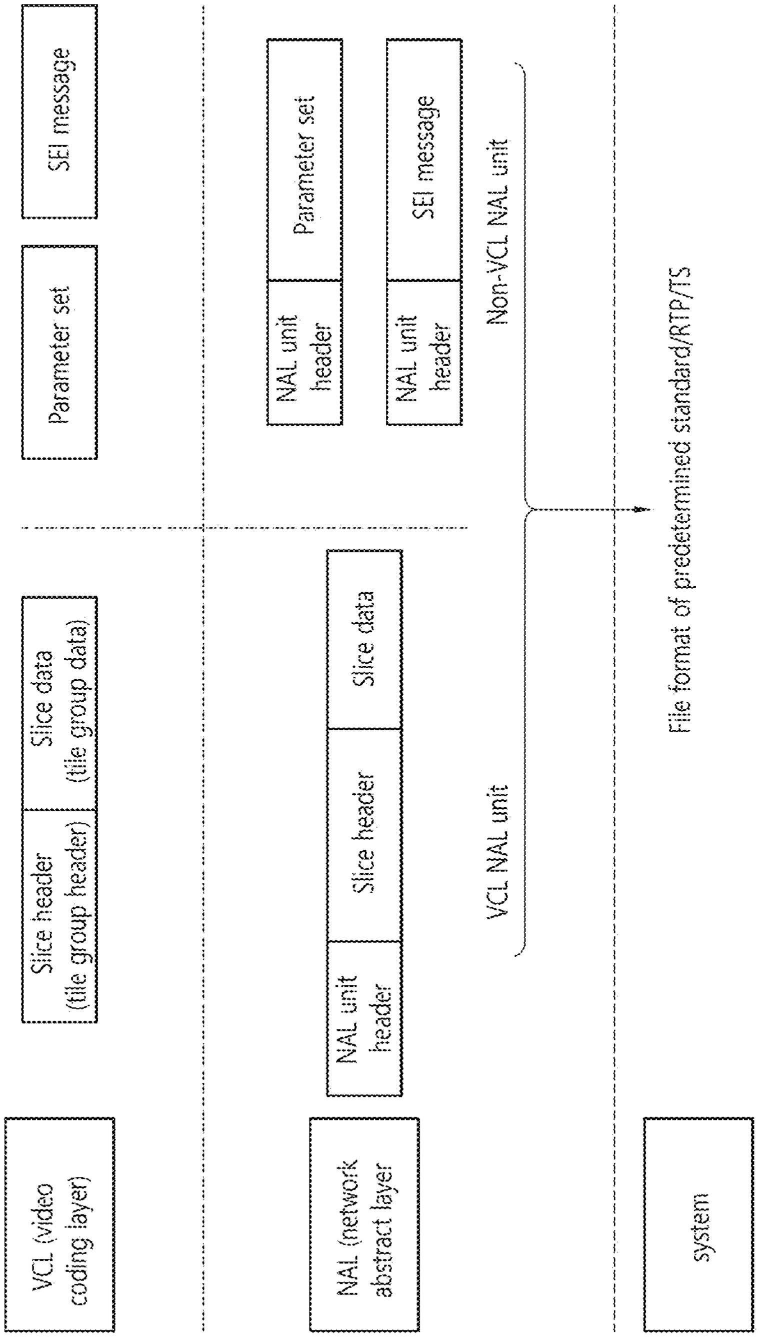
FIG. 4 schematically shows a hierarchical structure for coded video/image.

FIG. 4 exemplarily illustrates a layer structure for a coded video/image.

Referring to FIG. 4, a coded video/image is divided into a video coding layer (VCL) that performs decoding processing of a video/image and handles the decoding processing, a lower system that transmits and stores coded information, and a network abstraction layer (NAL) which exists between the VCL and the lower system, and serves to perform a network adaptation function.

VCL data including compressed image data (slice data), or a parameter set including a picture parameter set (PPS), a sequence parameter set (SPS), or a video parameter set (VPS), or a supplemental enhancement information (SEI) message additionally required in an image decoding process may be generated, in the VCL.

In the NAL, header information (NAL unit data) is added to a raw byte sequence payload (RSRP) generated in the VCL to generate the NAL unit. In here, the RBSP refers to the slice data, the parameter set, the SEI message, etc., generated in the VCL. The NAL unit header may include NAL unit type information specified according to RSRP data included in the corresponding NAL unit.

As illustrated in the figure above, the NAL unit may be classified into a VCL NAL unit and a non-VCL NAL unit according to the RSRP generated in the VCL. The VCL NAL unit may mean a NAL unit including information (slice data) on the information, and the non-VCL NAL unit may mean a NAL unit including information (parameter set or SEI message) required to decode the image.

The VCL NA unit and the non-VCL NAL unit may be transmitted through a network while header information is added according to a data standard of a sub system. For example, the NAL unit may be converted into a data format of a predetermined standard such as an H.266/VVC file format, a real-time transport protocol (RTP), a transport stream (TS), etc., and transported through various networks.

Further, as described above, in respect to the NAL unit, a NAL unit type may be specified according to an RBSP data structure included in the corresponding NAL unit, and information on the NAL unit type may be stored in a NAL unit header and signaled.

For example, the NAL unit may be classified into a VCL NAL unit type and a non-VCL NAL unit type according to whether the NAL unit includes information (slice data) on the image. Further, the VCL NAL unit type may be classified according to a property and a type of picture included in the VCL NAL unit and the non-VCL NAL unit may be classified according to the type of parameter set.

The following is an example of the NAL unit type specified according to the type of parameter set included in the non-VCL NAL unit type.

- Adaptation Parameter Set (APS) NAL unit: Type for the NAL unit including the APS
- DPS (Decoding Parameter Set) NAL unit: Type for the NAL unit including DPS
- Video Parameter Set (VPS) NAL unit: Type for the NAL unit including the VPS
- Sequence Parameter Set (SPS) NAL unit: Type for the NAL unit including the SPS
- Picture Parameter Set (PPS) NAL unit: Type for the NAL unit including the PPS
- Decoding Capability Information (DCI) NAL unit: Type for the NAL unit including the DCI Picture header (PH) NAL unit: Type for the NAL unit including the PH The above-described NAL unit types have syntax information for the NAL unit type, and the syntax information may be stored in a NAL unit header and signaled. For example, the syntax information may be nal_unit_type, and NAL unit types may be specified with a nal_unit_type value.

Meanwhile, as described above, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. In this document, slices may be mixed or replaced with tile groups. Also, in this document, the slice header may be mixed or replaced with type group headers.

The slice header (slice header syntax, slice header information) may include information/parameters commonly applicable to the slice. The APS (APS Syntax) or PPS (PPS Syntax) may include information/parameters commonly applicable to one or more slices or pictures. The SPS (SPS Syntax) may include information/parameters commonly applicable to one or more sequences. The VPS (VPS syntax) may include information/parameters commonly applicable to multiple layers. The DPS (DPS syntax) may include information/parameters that are commonly applicable to overall videos. The DPS may include information/parameters related to concatenation of a coded video sequence (CVS). The DCI (DCI syntax) may include information/parameters commonly applicable to overall video. The DCI may include information/parameters related to decoding capability. In this document, high level syntax (HLS) may include at least one of the APS syntax, PPS syntax, SPS syntax, VPS syntax, DPS syntax, DCI syntax, picture header syntax, or slice header syntax.

In this document, image/video information encoded from an encoding apparatus to a decoding apparatus and signaled in the form of a bitstream includes not only intra-picture partitioning related information, intra/inter prediction information, residual information, in-loop filtering information, and the like, but also information included in the slice header, information included in the picture header, information included in the APS, information included in the PPS, information included in an SPS, information included in a VPS, and/or information included in a DCI. Also, the image/video information may further include NAL unit header information.

A video/image encoding procedure based on inter prediction may schematically include, for example, the following.

Figure 5:
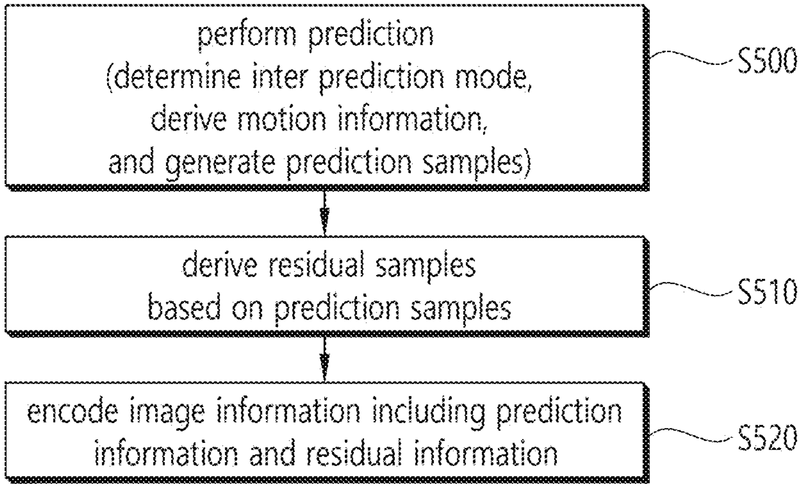
FIG. 5 shows an example of a video/image encoding method based on inter prediction.

FIG. 5 shows an example of an inter prediction-based video/image encoding method.

The encoding apparatus performs inter prediction on the current block (S500). The encoding apparatus may derive an inter prediction mode and motion information of the current block, and generate prediction samples of the current block. Here, the procedures of determining the inter prediction mode, deriving motion information, and generating prediction samples may be performed simultaneously, or one procedure may be performed before another procedure. For example, the inter predictor of the encoding apparatus may include a prediction mode determiner, a motion information deriver, and a prediction sample deriver, the prediction mode determiner may determine the prediction mode for the current block, and the motion information deriver may derive motion information of the current block, and the prediction sample deriver may derive prediction samples of the current block. For example, the inter predictor of the encoding apparatus searches for a block similar to the current block within a predetermined region (search region) of reference pictures through motion estimation and derive a reference block in which a difference from the current block is a minimum or a predetermined reference or less. Based on this, a reference picture index indicating a reference picture in which the reference block is located may be derived, and a motion vector may be derived based on a position difference between the reference block and the current block. The encoding apparatus may determine a mode applied to the current block from among various prediction modes. The encoding apparatus may compare rate-distortion (RD) costs for the various prediction modes and determine an optimal prediction mode for the current block.

For example, when a skip mode or a merge mode is applied to the current block, the encoding apparatus may construct a merge candidate list to be described later and derive a reference block in which a difference from the current block is minimal or a predetermined reference or less, among reference blocks indicated by merge candidates included in the merge candidate list. In this case, a merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the encoding apparatus constructs an (A)MVP candidate list to be described later, and use a motion vector of a selected mvp candidate, among motion vector predictor (mvp) candidates included in the (A)MVP candidate list, as an mvp of the current block. In this case, for example, a motion vector indicating a reference block derived by the motion estimation described above may be used as the motion vector of the current block, and an mvp candidate having a motion vector having the smallest difference from the motion vector of the current block, among the mvp candidates, may be the selected mvp candidate. A motion vector difference (MVD) that is a difference obtained by subtracting the mvp from the motion vector of the current block may be derived. In this case, information on the MVD may be signaled to the decoding apparatus. In addition, when the (A)MVP mode is applied, the value of the reference picture index may be configured as reference picture index information and separately signaled to the decoding apparatus.

The encoding apparatus may derive residual samples based on the prediction samples (S510). The encoding apparatus may derive the residual samples by comparing the original samples of the current block with the prediction samples.

The encoding apparatus encodes image information including prediction information and residual information (S520). The encoding apparatus may output encoded image information in the form of a bitstream. The prediction information may include information on prediction mode information (e.g., skip flag, merge flag or mode index, etc.) and motion information as information related to the prediction procedure. The information on the motion information may include candidate selection information (e.g., merge index, mvp flag, or mvp index) that is information for deriving a motion vector. In addition, the information on the motion information may include the MVD information described above and/or reference picture index information. Also, the information on the motion information may include information indicating whether L0 prediction, L1 prediction, or pair (bi) prediction is applied. The residual information is information on the residual samples. The residual information may include information on quantized transform coefficients for the residual samples.

The output bitstream may be stored in a (digital) storage medium and transmitted to the decoding apparatus or may be transmitted to the decoding apparatus through a network.

Meanwhile, as described above, the encoding apparatus may generate a reconstructed picture (including reconstructed samples and reconstructed blocks) based on the reference samples and the residual samples. This is because the encoding apparatus may derive the same prediction result as that performed by the decoding apparatus, and through this, coding efficiency may be increased. Accordingly, the encoding apparatus may store the reconstructed picture (or reconstructed samples, reconstructed block) in a memory and use the reconstructed picture as a reference picture for inter prediction. As described above, an in-loop filtering procedure may be further applied to the reconstructed picture.

A video/image decoding procedure based on inter prediction may schematically include, for example, the following.

Figure 6:
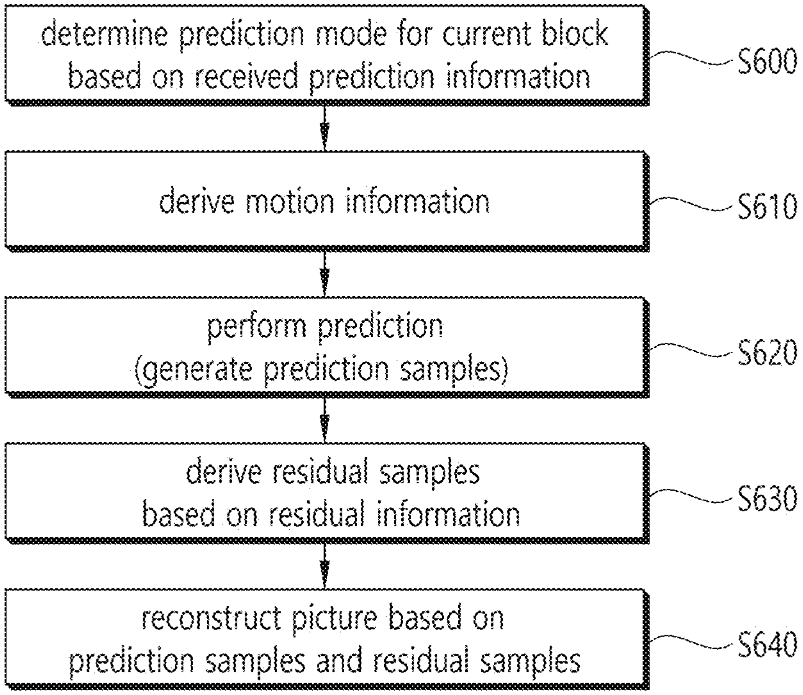
FIG. 6 shows an example of a video/image decoding method based on inter prediction.

FIG. 6 shows an example of a video/image decoding method based on inter prediction.

Referring to FIG. 6, the decoding apparatus may perform an operation corresponding to the operation performed by the encoding apparatus. The decoding apparatus may perform prediction on the current block based on the received prediction information and derive prediction samples.

Specifically, the decoding apparatus may determine a prediction mode for the current block based on the received prediction information (S600). The decoding apparatus may determine which inter prediction mode is to be applied to the current block based on prediction mode information in the prediction information.

For example, based on the merge flag, it may be determined whether the merge mode is applied to the current block or whether the (A)MVP mode is determined. Alternatively, one of various inter prediction mode candidates may be selected based on the mode index. The inter prediction mode candidates may include skip mode, merge mode, and/or (A)MVP mode, or may include various inter prediction modes to be described later.

The decoding apparatus derives motion information of the current block based on the determined inter prediction mode (S610). For example, when the skip mode or the merge mode is applied to the current block, the decoding apparatus may construct a merge candidate list to be described later and select one merge candidate from among the merge candidates included in the merge candidate list. The selection may be performed based on the selection information (merge index) described above. The motion information of the current block may be derived using the motion information of the selected merge candidate. The motion information of the selected merge candidate may be used as the motion information of the current block.

As another example, when the (A)MVP mode is applied to the current block, the decoding apparatus may construct an (A)MVP candidate list to be described later and use a motion vector of a selected mvp candidate, among motion vector predictor (mvp) candidates included in the (A)MVP candidate list, as the mvp of the current block. The selection may be performed based on the selection information (mvp flag or mvp index) described above. In this case, the MVD of the current block may be derived based on the information on the MVD, and a motion vector of the current block may be derived based on the mvp of the current block and the MVD. Also, the reference picture index of the current block may be derived based on the reference picture index information. A picture indicated by the reference picture index in the reference picture list for the current block may be derived as a reference picture referenced for inter prediction of the current block.

Meanwhile, as will be described later, the motion information of the current block may be derived without configuring a candidate list. In this case, the motion information of the current block may be derived according to a procedure disclosed in a prediction mode to be described later. In this case, the configuration of the candidate list as described above may be omitted.

The decoding apparatus may generate prediction samples for the current block based on the motion information of the current block (S620). In this case, the reference picture may be derived based on the reference picture index of the current block, and prediction samples of the current block may be derived using samples of the reference block indicated by the motion vector of the current block on the reference picture. In this case, as described later, a prediction sample filtering procedure may be further performed on all or some of the prediction samples of the current block in some cases.

For example, the inter predictor of the decoding apparatus may include a prediction mode determiner, a motion information deriver, and a prediction sample deriver. The prediction mode determiner may determine a prediction mode for the current block based on the received prediction mode information, the motion information deriver may derive motion information (motion vector and/or reference picture index, etc.) of the current block based on the information on the received motion information received, and the prediction sample deriver may derive prediction samples of the current block.

The decoding apparatus generates residual samples for the current block based on the received residual information (S630). The decoding apparatus may generate reconstructed samples for the current block based on the prediction samples and the residual samples, and generate a reconstructed picture based thereon (S640). Thereafter, as described above, an in-loop filtering procedure may be further applied to the reconstructed picture.

Figure 7:
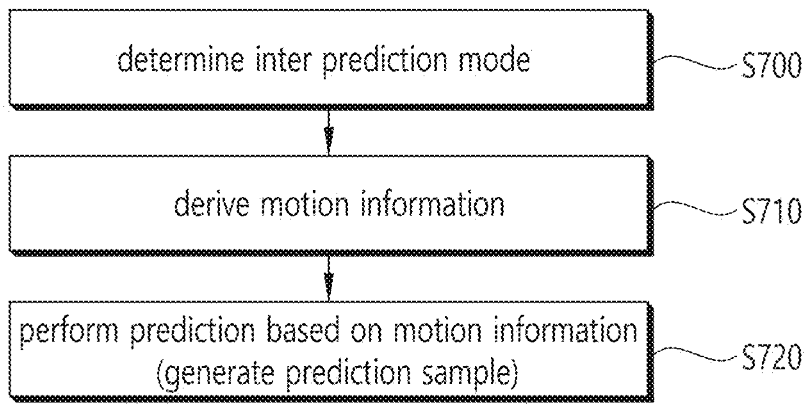
FIG. 7 exemplarily shows an inter prediction procedure.

FIG. 7 exemplarily shows an inter prediction procedure.

Referring to FIG. 7, as described above, the inter prediction procedure may include determining an inter prediction mode, deriving motion information according to the determined prediction mode, and performing prediction based on the derived motion information (generation of a prediction sample). The inter prediction procedure may be performed by the encoding apparatus and the decoding apparatus as described above. In this document, a coding apparatus may include the encoding apparatus and/or the decoding apparatus.

Referring to FIG. 7, the coding apparatus determines an inter prediction mode for the current block (S700). Various inter prediction modes may be used for prediction of a current block within a picture. For example, various modes such as merge mode, skip mode, motion vector prediction (MVP) mode, affine mode, subblock merge mode, merge with MVD (MMVD) mode, historical motion vector prediction (HMVP) mode, etc. DMVR (decoder side motion vector refinement) mode, AMVR (adaptive motion vector resolution) mode, BCW (Bi-prediction with CU-level weight), BDOF (Bi-directional optical flow), etc. may be used as ancillary modes in addition or instead. The affine mode may be referred to as an affine motion prediction mode. The MVP mode may be referred to as an advanced motion vector prediction (AMVP) mode. In this document, some modes and/or motion information candidates derived by some modes may be included as one of motion information-related candidates of other modes. For example, the HMVP candidate may be added as a merge candidate of the merge/skip mode or may be added as an mvp candidate of the MVP mode.

The prediction mode information indicating the inter prediction mode of the current block may be signaled from the encoding apparatus to the decoding apparatus. The prediction mode information may be included in a bitstream and received at the decoding apparatus. The prediction mode information may include index information indicating one of multiple candidate modes. Further, the inter prediction mode may be indicated through hierarchical signaling of flag information. In this case, the prediction mode information may include one or more flags. For example, it may be indicated whether the skip mode is applied by signaling the skip flag; it may be indicated whether the merge mode is applied by signaling the merge flag for the skip mode not being applied; and it may be indicated that the MVP mode is applied or a flag for further partition may be further signaled when the merge mode is not applied. The affine mode may be signaled as an independent mode, or may be signaled as a mode dependent on the merge mode, the MVP mode or the like. For example, the affine mode may include an affine merge mode and an affine MVP mode.

Meanwhile, information indicating whether or not the above-described list0 (L0) prediction, list1 (L1) prediction, or bi-prediction is used in the current block (current coding unit) may be signaled to the current block. Said information may be referred to as motion prediction direction information, inter prediction direction information, or inter prediction indication information, and may be constructed/encoded/signaled in the form of, for example, an inter_pred_idc syntax element. That is, the inter_pred_idc syntax element may indicate whether or not the above-described list0 (L0) prediction, list1(L1) prediction, or bi-prediction is used for the current block (current coding unit). In this document, for convenience of description, the inter prediction type (L0 prediction, L1 prediction, or BI prediction) indicated by the inter_pred_idc syntax element may be represented as a motion prediction direction. L0 prediction may be represented by pred_L0; L1 prediction may be represented by pred_L1; and bi-prediction may be represented by pred_BI. For example, the following prediction type may be indicated according to the value of the inter_pred_idc syntax element.

As described above, one picture may include one or more slices. A slice may have one of the slice types including intra (I) slice, predictive (P) slice, and bi-predictive (B) slice. The slice type may be indicated based on slice type information. For blocks in I slice, inter prediction is not used for prediction, and only intra prediction may be used. Of course, even in this case, the original sample value may be coded and signaled without prediction. For blocks in P slice, intra prediction or inter prediction may be used, and when inter prediction is used, only uni prediction may be used. Meanwhile, intra prediction or inter prediction may be used for blocks in B slice, and when inter prediction is used, up to the maximum bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, a reference picture index lower relative to reference pictures earlier than the current picture in POC order may be allocated to L0, and a reference picture index lower relative to reference pictures later than the current picture in POC order may be allocated to L1. In the case of B slice, bi-prediction may be applied, and in this case, unidirectional bi-prediction may be applied, or bi-directional bi-prediction may be applied. Bi-directional bi-prediction may be referred to as true bi-prediction.

Specifically, for example, information on the inter prediction mode of the current block may be coded and signaled at a CU (CU syntax) level or the like, or may be implicitly determined according to a condition. In this case, some modes may be explicitly signaled, and other modes may be implicitly derived.

For example, the CU syntax may carry information on the (inter) prediction mode, etc. as shown in Table 1 below.

TABLE 1

| | Descriptor |
|---|---|
| coding_unit( x0, y0, cbWidth, cbHeight, treeType ) { | |
| if( slice_type != I || sps_ibc_enabled_flag ) { | |
| if( treeType != DUAL_TREE_CHROMA && | |
| !( cbWidth = = 4 && cbHeight = = 4 && !sps_ibc_enabled_flag ) ) | |
| cu_skip_flag[ x0 ][ y0 ] | ae(v) |
| if( cu_skip_flag[ x0 ][ y0 ] = = 0 && slice_type != I | |
| && !( cbWidth = = 4 && cbHeight = = 4 ) ) | |
| pred_mode_flag | ae(v) |
| if( ( ( slice_type = = I && cu_skip_flag[ x0 ][ y0 ] = =0 ) || | |
| ( slice_type != I && ( CuPredMode[ x0 ][ y0 ] != MODE_INTRA || | |
| ( cbWidth = = 4 && cbHeight = = 4 && cu_skip_flag[ x0 ][ y0 ] = = 0 ) ) ) ) && | |
| sps_ibc_enabled_flag && ( cbWidth != 128 || cbHeight != 128 ) ) | |
| pred_mode_ibc_flag | ae(v) |
| } | |
| if( CuPredMode[ x0 ][ y0 ] = = MODE_INTRA ) { | |
| if( sps_pcm_enabled_flag && | |
| cbWidth >= MinIpcmCbSizeY && cbWidth <= MaxIpcmCbSizeY && | |
| cbHeight >= MinIpcmCbSizeY && cbHeight <= MaxIpcmCbSizeY ) | |
| pcm_flag[ x0 ][ y0 ] | ae(v) |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |

TABLE 1-continued

| | Descriptor |
|---|---|
| if( treeType = = SINGLE_TREE \|\| treeType = = DUAL_TREE_LUMA ) { | |
| if( cbWidth <= 32 && cbHeight <= 32 ) | |
| intra_bdpcm_flag[ x0 ][ y0 ] | ae(v) |
| if( intra_bdpcm_flag[ x0 ][ y0 ] ) | |
| intra_bdpcm_dir_flag[ x0 ][ y0 ] | ae(v) |
| else { | |
| if( sps_mip_enabled_flag && | |
| ( Abs( Log2( cbWidth ) − Log2( cbHeight ) ) <= 2 ) && | |
| cbWidth <= MaxTbSizeY && cbHeight <= MaxTbSizeY ) | |
| intra_mip flag[ x0 ][ y0 ] | ae(v) |
| if( intra_mip_flag[ x0 ][ y0 ] ) { | |
| intra_mip_mpm_flag[ x0 ][ y0 ] | ae(v) |
| if( intra_mip_mpm_flag[ x0 ][ y0 ] ) | |
| intra_mip_mpm_idx[ x0 ][ y0 ] | ae(v) |
| else | |
| intra_mip_mpm_remainder[ x0 ][ y0 ] | ae(v) |
| } else { | |
| if( sps_mrl_enabled_flag && ( ( y0 % CtbSizeY ) > 0 ) ) | |
| intra_luma_ref_idx[ x0 ][ y0 ] | ae(v) |
| if (sps_isp_enabled_flag && intra_luma_ref_idx[ x0 ][ y0 ] = = 0 && | |
| ( cbWidth <= MaxTbSizeY && cbHeight <= MaxTbSizeY ) && | |
| ( cbWidth * cbHeight > MinTbSizeY * MinTbSizeY ) ) | |
| intra_subpartitions_mode_flag[ x0 ][ y0 ] | ae(v) |
| if( intra_subpartitions_mode_flag[ x0 ][ y0 ] = = 1 && | |
| cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && | |
| intra_subpartitions_mode_flag[ x0 ][ y0 ] = = 0 ) | |
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| if( treeType = = SINGLE_TREE \|\| treeType = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER or MODE_IBC */ | |
| if( cu_skip_flag[ x0 ][ y0 ] = = 0 ) | |
| general_merge_flag[ x0 ][ y0 ] | ae(v) |
| if( general_merge_flag[ x0 ][ y0 ] ) { | |
| merge_data( x0, y0, cbWidth, cbHeight ) | |
| } else if ( CuPredMode[ x0 ][ y0] = = MODE_IBC ) { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_precision_flag[ x0 ][ y0 ] | ae(v) |
| } | |
| } else { | |
| if( slice_type = = B ) | |
| inter_pred_idc[ x0 ][ y0 ] | ae(v) |
| if( sps_affine_enabled_flag && cbWidth >= 16 && cbHeight >= 16 ) { | |
| inter_affine_flag[ x0 ][ y0 ] | ae(v) |
| if( sps_affine_type_flag && inter_affine_flag[ x0 ][ y0 ] ) | |
| cu_affine_type_flag[ x0 ][ y0 ] | ae(v) |
| } | |
| if( sps_smvd_enabled_flag && inter_pred_idc[ x0 ][ y0 ] = = PRED_BI && | |
| !inter_affine_flag[ x0 ][ y0 ] && RefIdxSymL0 > −1 && RefIdxSymL1 > | |
| −1 ) | |
| sym_mvd_flag[ x0 ][ y0 ] | ae(v) |
| if( inter_pred_idc[ x0 ][ y0 ] != PRED_L1 ) { | |
| if( NumRefIdxActive[ 0 ] > 1 && !sym_myd_flag[ x0 ][ y0 ] ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |

TABLE 1-continued

| | Descriptor |
|---|---|
| } | |
| if( inter_pred_idc[ x0 ][ y0 ] != PRED_L0 ) { | |
| if( NumRefIdxActive[ 1 ] > 1 && !sym_mvd_flag[ x0 ][ y0 ] ) | |
| ref_idx_l1[ x0 ][ y0 ] | ae(v) |
| if( mvd_l1_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| MvdCpL1[ x0 ][ y0 ][ 0 ][ 0 ] = 0 | |
| MvdCpL1[ x0 ][ y0 ][ 0 ][ 1 ] = 0 | |
| MvdCpL1[ x0 ][ y0 ][ 1 ][ 0 ] = 0 | |
| MvdCpL1[ x0 ][ y0 ][ 1 ][ 1 ] = 0 | |
| MvdCpL1[ x0 ][ y0 ][ 2 ][ 0 ] = 0 | |
| MvdCpL1[ x0 ][ y0 ][ 2 ][ 1 ] = 0 | |
| } else { | |
| if( sym_mvd_flag[ x0 ][ y0 ] ) { | |
| MvdL1[ x0 ][ y0 ][ 0 ] = −MvdL0[ x0 ][ y0 ][ 0 ] | |
| MvdL1[ x0 ][ y0 ][ 1 ] = −MvdL0[ x0 ][ y0 ][ 1 ] | |
| } else | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| mvp_l1_flag[ x0 ][ y0 ] | ae(v) |
| } | |
| } else { | |
| MvdL1[ x0 ][ y0 ][ 0 ] = 0 | |
| MvdL1[ x0 ][ y0 ][ 1 ] = 0 | |
| } | |
| if( ( sps_amvr_enabled_flag && inter_affine_flag[ x0 ][ y0 ] = = 0 && | |
| ( MvdL0[ x0 ][ y0 ][ 0 ] != 0 \|\| MvdL0[ x0 ][ y0 ][ 1 ] != 0 \|\| | |
| MvdL1[ x0 ][ y0 ][ 0 ] != 0 \|\| MvdL1[ x0 ][ y0 ][ 1 ] != 0 ) ) \|\| | |
| ( sps_affine_amvr_enabled_flag && inter_affine_flag[ x0 ][ y0 ] = = 1 && | |
| ( MvdCpL0[ x0 ][ y0 ][ 0 ] [ 0 ] != 0 \|\| MvdCpL0[ x0 ][ y0 ][ 0 ] [ 1 ] != 0 \|\| | |
| MvdCpL1[ x0 ][ y0 ][ 0 ] [ 0 ] != 0 \|\| MvdCpL1[ x0 ][ y0 ][ 0 ] [ 1 ] != 0 \|\| | |
| MvdCpL0[ x0 ][ y0 ][ 1 ] [ 0 ] != 0 \|\| MvdCpL0[ x0 ][ y0 ][ 1 ] [ 1 ] != 0 \|\| | |
| MvdCpL1[ x0 ][ y0 ][ 1 ] [ 0 ] != 0 \|\| MvdCpL1[ x0 ][ y0 ][ 1 ] [ 1 ] != 0 \|\| | |
| MvdCpL0[ x0 ][ y0 ][ 2 ] [ 0 ] != 0 \|\| MvdCpL0[ x0 ][ y0 ][ 2 ] [ 1 ] != 0 \|\| | |
| MvdCpL1[ x0 ][ y0 ][ 2 ] [ 0 ] != 0 \|\| MvdCpL1[ x0 ][ y0 ][ 2 ] [ 1 ] != 0 ) ) { | |
| amvr_flag[ x0 ][ y0 ] | ae(v) |
| if( amvr_flag[ x0 ][ y0 ] ) | |
| amvr_precision_flag[ x0 ][ y0 ] | ae(v) |
| } | |
| if( sps_bcw_enabled_flag && inter_pred_idc[ x0 ][ y0 ] = = PRED_BI && | |
| luma_weight_l0_flag[ ref_idx_l0 [ x0 ][ y0 ] ] = = 0 && | |
| luma_weight_l1_flag[ ref_idx_l1 [ x0 ][ y0 ] ] 0 && | |
| chroma_weight_l0_flag[ ref_idx_l0 [ x0 ][ y0 ] ] = = 0 && | |
| chroma_weight_l1_flag[ ref_idx_l1 [ x0 ][ y0 ] ] = = 0 && | |
| cbWidth * cbHeight >= 256 ) | |
| bcw_idx[ x0 ][ y0 ] | ae(v) |
| } | |
| } | |
| if( !pcm_flag[ x0 ][ y0 ] ) { | |
| if( CuPredMode[ x0 ][ y0] != MODE_INTRA && | |
| general merge flag[ x0 ][ y0 ] = = 0 ) | |
| cu_cbf | ae(v) |
| if( cu_cbf ) { | |
| if( CuPredMode[ x0 ][ y0 ] = = MODE_INTER && sps_sbt_enabled_flag && | |
| !ciip_flag[ x0 ][ y0 ] && !MergeTriangleFlag[ x0 ][ y0 ] ) { | |
| if( cbWidth <= MaxSbtSize && cbHeight <= MaxSbtSize ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \|\| allowSbtHorH \|\| allowSbtVerQ \|\| allowSbtHorQ ) | |
| cu_sbt_flag | ae(v) |
| } | |
| if( cu_sbt_flag ) { | |
| if( ( allowSbtVerH \|\| allowSbtHorH ) && ( allowSbtVerQ \|\| | |

TABLE 1-continued

| | Descriptor |
|---|---|
| allowSbtHorQ) ) | |
| cu_sbt_quad_flag | ae(v) |
| if( ( cu_sbt_quad_flag && allowSbtVerQ && allowSbtHorQ ) \|\| | |
| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| numSigCoeff = 0 | |
| numZeroOutSigCoeff = 0 | |
| transform_tree( x0, y0, cbWidth, cbHeight, treeType ) | |
| lfnstWidth = ( treeType = = DUAL_TREE_CHROMA ) ? cbWidth / SubWidthC | |
| : cbWidth | |
| lfnstHeight = ( treeType = = | |
| DUAL_TREE_CHROMA ) ? cbHeight / SubHeightC | |
| : cbHeight | |
| if( Min( lfnstWidth, lfnstHeight ) >= 4 && sps_lfnst_enabled_flag = = 1 | |
| && | |
| CuPredMode[ x0 ][ y0 ] = = MODE_INTRA && | |
| IntraSubPartitionsSplitType = = ISP_NO_SPLIT && | |
| !intra_mip_flag[ x0 ][ y0 ] ) { | |
| if( ( numSigCoeff > ( ( treeType = = SINGLE_TREE ) ? 2 : 1 ) ) && | |
| numZeroOutSigCoeff = = 0 ) | |
| lfnst_idx[ x0 ][ y0 ] | ae(v) |
| } | |
| } | |
| } | |
| } | |

Here, cu_skip_flag may indicate whether the skip mode is applied to the current block (CU).

pred_mode_flag equal to 0 specifies that the current coding unit is coded in inter prediction mode. Pred_mode_flag equal to 1 specifies that the current coding unit is coded in intra prediction mode.

pred_mode_ibc_flag equal to 1 specifies that the current coding unit is coded in IBC prediction mode. Pred_mode_ibc_flag equal to 0 specifies that the current coding unit is not coded in IBC prediction mode.

pcm_flag[x0][y0] equal to 1 specifies that the pcm_sample( ) syntax structure is present for the coding unit including the luma coding block at location (x0, y0), and the transform_tree( ) syntax structure is not present. Pcm_flag [x0][y0] equal to 0 specifies that pcm_sample( ) syntax structure is not present. That is, pcm_flag may represent whether a pulse coding modulation (PCM) mode is applied to the current block. If PCM mode is applied to the current block, prediction, transformation, quantization, etc. Are not applied, and values of the original sample in the current block may be coded and signaled.

intra_mip_flag[x0][y0] equal to 1 specifies that the intra prediction type for luma samples is matrix-based intra prediction (MIP). Intra_mip_flag[x0][y0] equal to 0 specifies that the intra prediction type for luma samples is not matrix-based intra prediction. That is, intra_mip_flag may represent whether an MIP prediction mode (type) is applied to (a luma sample of) the current block.

intra_chroma_pred_mode[x0][y0] specifies the intra prediction mode for chroma samples in the current block.

general_merge_flag[x0][y0] specifies whether the inter prediction parameters for the current coding unit are inferred from a neighbouring inter-predicted partition. That is, general_merge_flag may represent that general merge is available, and when the value of general_merge_flag is 1, regular merge mode, mmvd mode, and merge subblock mode (subblock merge mode) may be available. For example, when the value of general_merge_flag is 1, merge data syntax may be parsed from encoded video/image information (or bitstream), and the merge data syntax configured/coded to include information as shown in Table 2 below.

TABLE 2

| | Descriptor |
|---|---|
| merge_data( x0, y0, cbWidth, cbHeight ) { | |
| if ( CuPredMode[ x0 ][ y0] = = MODE_IBC ) { | |
| if( MaxNumMergeCand > 1 ) | |
| merge_idx[ x0 ][ y0 ] | ae(v) |
| } else { | |
| if( sps_mmvd_enabled_flag \|\| cbWidth * cbHeight != 32 ) | |
| regular_merge_flag[ x0 ][ y0 ] | ae(v) |
| if ( regular_merge_flag[ x0 ][ y0 ] = = 1 ){ | |
| if( MaxNumMergeCand > 1 ) | |
| merge_idx[ x0 ][ y0 ] | ae(v) |
| } else { | |
| if( sps_mmvd_enabled_flag && cbWidth * cbHeight != 32 ) | |
| mmvd_merge_flag[ x0 ][ y0 ] | ae(v) |
| if( mmvd_merge_flag[ x0 ][ y0 ] = = 1 ) { | |
| if( MaxNumMergeCand > 1 ) | |
| mmvd_cand_flag[ x0 [ y0 ] | ae(v) |

TABLE 2-continued

| | Descriptor |
|---|---|
| mmvd_distance_idx[ x0 ][ y0 ] | ae(v) |
| mmvd_direction_idx[ x0 ][ y0 ] | ae(v) |
| } else { | |
| if( MaxNumSubblockMergeCand > 0 && cbWidth >= 8 && cbHeight >= 8 ) | |
| merge_subblock_flag[ x0 ][ y0 ] | ae(v) |
| if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |
| if( sps_ciip_enabled_flag && cu_skip_flag[ x0 ][ y0 ] = = 0 && | |
| ( cbWidth * cbHeight ) >= 64 && cbWidth < 128 && cbHeight < 128 ) { | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| } | |
| if( MergeTriangleFlag[ x0 ][ y0 ] ) { | |
| merge_triangle_split_dir[ x0 ][ y0 ] | ae(v) |
| merge_triangle_idx0[ x0 ][ y0 ] | ae(v) |
| merge_triangle_idx1[ x0 ][ y0 ] | ae(v) |
| } | |
| } | |
| } | |
| } | |
| } | |
| } | |

Here, regular_merge_flag[x0][y0] equal to 1 specifies that regular merge mode is used to generate the inter prediction parameters of the current coding unit. That is, regular_merge_flag represents whether the merge mode (regular merge mode) is applied to the current block.

mmvd_merge_flag[x0][y0] equal to 1 specifies that merge mode with motion vector difference is used to generate the inter prediction parameters of the current coding unit. That is, mmvd_merge_flag represents whether MMVD is applied to the current block.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0].

mmvd_distance_idx[x0][y0] specifies the index used to derive MmvdDistance[x0][y0].

mmvd_direction_idx[x0][y0] specifies index used to derive MmvdSign[x0][y0].

merge_subblock_flag[x0][y0] specifies the subblock-based inter prediction parameters for the current coding. That is, merge_subblock_flag may represents whether a subblock merge mode (or affine merge mode) is applied to the current block.

merge_subblock_idx[x0][y0] specifies the merging candidate index of the subblock-based merging candidate list.

ciip_flag[x0][y0] specifies whether the combined inter-picture merge and intra-picture prediction is applied for the current coding unit.

merge_triangle_idx0[x0][y0] specifies the first merging candidate index of the triangular shape based motion compensation candidate list.

merge_triangle_idx1[x0][y0] specifies the second merging candidate index of the triangular shape based motion compensation candidate list.

merge_idx[x0][y0] specifies the merging candidate index of the merging candidate list.

Meanwhile, referring back to the CU syntax of Table 1, mvp_l0_flag[x0][y0] specifies the motion vector predictor index of list 0. That is, when the MVP mode is applied, mvp_l0_flag may represent a candidate selected for MVP derivation of the current block from the MVP candidate list 0.

ref_idx_l1[x0][y0] has the same semantics as ref_idx_l0, with l0 and list 0 may be replaced by l1 and list 1, respectively. (ref_idx_l1[x0][y0] has the same semantics as ref_idx_l0, with l0, L0 and list 0 replaced by l1, L1 and list 1, respectively.)

inter_pred_idc[x0][y0] specifies whether list0, list1, or bi-prediction is used for the current coding unit.

sym_mvd_flag[x0][y0] equal to 1 specifies that the syntax elements ref_idx_l0[x0][y0] and ref_idx_l1[x0][y0], and the mvd_coding(x0, y0, refList,cpIdx) syntax structure for refList equal to 1 are not present. That is, sym_mvd_flag represents whether symmetric MVD is used in mvd coding.

ref_idx_l0[x0][y0] specifies the list 0 reference picture index for the current coding unit.

ref_idx_l1[x0][y0] has the same semantics as ref_idx_l0, with l0, L0 and list 0 replaced by l1, L1 and list 1, respectively.

inter_affine_flag[x0][y0] equal to 1 specifies that for the current coding unit, when decoding a P or B slice, affine model based motion compensation is used to generate the prediction samples of the current coding unit.

cu_affine_type_flag[x0][y0] equal to 1 specifies that for the current coding unit, when decoding a P or B slice, 6-parameter affine model based motion compensation is used to generate the prediction samples of the current coding unit. Cu_affine_type_flag[x0][y0] equal to 0 specifies that 4-parameter affine model based motion compensation is used to generate the prediction samples of the current coding unit.

amvr_flag[x0][y0] specifies the resolution of motion vector difference. The array indices x0, y0 specify the location (x0, y0) of the top-left luma sample of the considered coding block relative to the top-left luma sample of the picture. Amvr_flag[x0][y0] equal to 0 specifies that the resolution of the motion vector difference is ¼ of a luma sample. Amvr- _flag[x0][y0] equal to 1 specifies that the resolution of the motion vector difference is further specified by amvr_precision_flag[x0][y0].

amvr_precision_flag[x0][y0] equal to 0 specifies that the resolution of the motion vector difference is one integer luma sample if inter_affine_flag[x0][y0] is equal to 0, and 1/16 of a luma sample otherwise. Amvr_precision_flag[x0][y0] equal to 1 specifies that the resolution of the motion vector difference is four luma samples if inter_affine_flag[x0][y0] is equal to 0, and one integer luma sample otherwise. The array indices x0, y0 specify the location (x0, y0) of the top-left luma sample of the considered coding block relative to the top-left luma sample of the picture.

bcw_idx[x0][y0] specifies the weight index of bi-prediction with CU weights.

When the (inter) prediction mode for the current block is determined, the coding apparatus derives motion information for the current block based on the prediction mode (S610).

The coding apparatus may perform inter prediction using motion information of the current block. The encoding apparatus may derive optimal motion information for the current block through a motion estimation procedure. For example, the encoding apparatus may search for a similar reference block with high correlation within a predetermined search range in the reference picture in fractional pixel units by using the original block in the original picture with respect to the current block and derive motion information therethrough. The block similarity may be derived based on a difference between phase-based sample values. For example, the block similarity may be calculated based on the SAD between the current block (or the template of the current block) and the reference block (or the template of the reference block). In this case, motion information may be derived based on a reference block having the smallest SAD in the search area. The derived motion information may be signaled to the decoding apparatus according to various methods based on the inter prediction mode.

When the motion information on the current block is derived, the coding apparatus performs inter prediction based on the motion information on the current block (S720). The coding apparatus may derive prediction sample(s) for the current block based on the motion information. The current block including the prediction samples may be referred to as a predicted block.

Reconstructed samples and a reconstructed picture may be generated based on the derived prediction samples, and then procedures such as in-loop filtering may be performed.

Meanwhile, intra prediction may be performed to derive a prediction sample for the current block.

Figure 8:
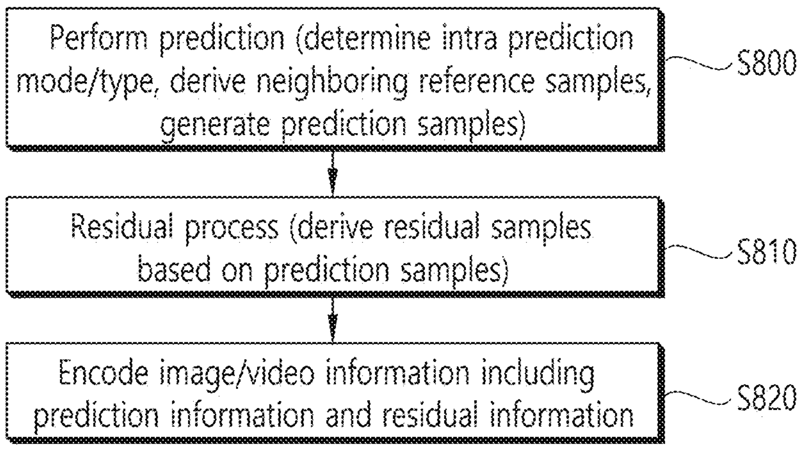
FIG. 8 shows an example of a video/image encoding method based on intra prediction.

FIG. 8 shows an example of a video/image encoding method based on intra prediction.

Referring to FIG. 8, S800 may be performed by the intra predictor 222 of the encoding apparatus, and S810 may be performed by the residual processor 230 of the encoding apparatus. Specifically, S810 may be performed by the subtractor 231 of the encoding apparatus. In S820, prediction information may be derived by the intra predictor 222 and encoded by the entropy encoder 240. In S820, residual information may be derived by the residual processor 230 and encoded by the entropy encoder 240. The residual information is information about residual samples. The residual information may include information about quantized transform coefficients of residual samples. As described above, the residual samples may be derived as transform coefficients through a transformer of the encoding apparatus, and the transform coefficients may be derived as quantized transform coefficients through a quantizer. Information about quantized transform coefficients may be encoded in the entropy encoder 240 through a residual coding process.

The encoding apparatus performs intra prediction on the current block (S800). The encoding apparatus may derive an intra prediction mode/type for the current block, derive neighboring reference samples of the current block, and generate prediction samples within the current block based on the intra prediction mode/type and the neighboring reference samples. Here, intra prediction mode/type determination, neighboring reference samples derivation, and prediction samples generation process may be performed simultaneously, or one process may be performed prior to another process.

For example, the intra predictor 222 of the encoding apparatus may include an intra prediction mode/type determiner, a reference sample deriver, and a prediction sample deriver. The intra prediction mode/type determiner determines the intra prediction mode/type for the current block, the reference sample deriver derives neighboring reference samples of the current block, and the prediction sample deriver may derive prediction samples of the current block. Meanwhile, when a prediction sample filtering process is performed, the intra predictor 222 may further include a prediction sample filter. The encoding apparatus may determine a mode/type applied to the current block from among a plurality of intra prediction modes/types. The encoding apparatus may compare RD costs for intra prediction modes/types and determine an optimal intra prediction mode/type for the current block.

As described above, the encoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The encoding apparatus generates residual samples for the current block based on the (filtered) prediction samples (S810). The encoding apparatus may compare prediction samples from original samples of the current block based on phase and derive residual samples.

The encoding apparatus may encode image information including intra prediction information (prediction information) and residual information about residual samples (S820). Prediction information may include intra prediction mode information and intra prediction type information. Residual information may include residual coding syntax. The encoding apparatus may transform/quantize the residual samples to derive quantized transform coefficients. The residual information may include information about the quantized transform coefficients.

The encoding apparatus may output encoded image information in the form of a bitstream. The output bitstream may be delivered to a decoding apparatus through a storage medium or network.

As described above, the encoding apparatus may generate a reconstructed picture (including reconstructed samples and a reconstructed block). To this end, the encoding apparatus may derive (modified) residual samples by dequantizing/inverse transforming the quantized transform coefficients again. The reason for performing dequantization/inverse transformation after transforming/quantizing the residual samples in this way is to derive the same residual samples as the residual samples derived from the decoding apparatus as described above. The encoding apparatus may generate a reconstructed block including reconstructed samples for the current block based on prediction samples and (modified) residual samples. A reconstructed picture for a current picture may be generated based on the reconstructed block. As described above, an in-loop filtering process or the like may be further applied to the reconstructed picture.

Figure 9:
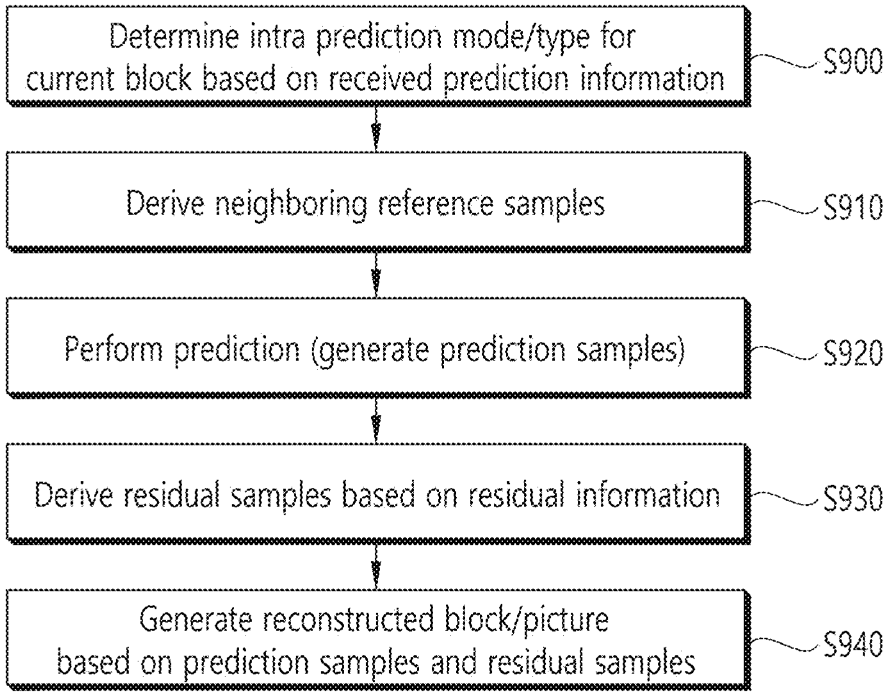
FIG. 9 shows an example of a video/image decoding method based on intra prediction.

FIG. 9 shows an example of a video/image decoding method based on intra prediction.

Referring to FIG. 9, the decoding apparatus may perform an operation corresponding to the operation performed by the above-described encoding apparatus. S900 to S920 may be performed by the intra predictor 331 of the decoding apparatus, and the prediction information of S900 and the residual information of S930 may be obtained from the bitstream by the entropy decoder 310 of the decoding apparatus. The residual processor 320 of the decoding apparatus may derive residual samples for the current block based on the residual information. Specifically, the dequantizer 321 of the residual processor 320 derives transform coefficients by performing dequantization based on the quantized transform coefficients derived based on the residual information, and the inverse transformer of the residual processor 322 may derive residual samples for the current block by performing an inverse transform on the transform coefficients. S940 may be performed by the adder 340 or a reconstructor of the decoding apparatus.

The decoding apparatus may derive an intra prediction mode/type for the current block based on the received prediction information (intra prediction mode/type information) (S900). The decoding apparatus may derive neighboring reference samples of the current block (S910). The decoding apparatus generates prediction samples within the current block based on the intra prediction mode/type and neighboring reference samples (S920). In this case, the decoding apparatus may perform a prediction sample filtering process. Prediction sample filtering may be referred to as post filtering. Some or all of the prediction samples may be filtered through the prediction sample filtering process. In some cases, the prediction sample filtering process may be omitted.

The decoding apparatus generates residual samples for the current block based on the received residual information (S930). The decoding apparatus may generate reconstructed samples for the current block based on the prediction samples and residual samples, and derive a reconstructed block including the reconstructed samples (S940). A reconstructed picture for a current picture may be generated based on the reconstructed block. As described above, an in-loop filtering process or the like may be further applied to the reconstructed picture.

Here, the intra predictor 331 of the decoding apparatus may include an intra prediction mode/type determiner, a reference sample deriver, and a prediction sample deriver. The intra prediction mode/type determiner determines the intra prediction mode/type of the current block based on the intra prediction mode/type information obtained from the entropy decoder 310, and the reference sample deriver may derive neighboring reference samples of the current block, and the prediction sample deriver may derive prediction samples of the current block. Meanwhile, when the above-described prediction sample filtering process is performed, the intra prediction unit 331 may further include a prediction sample filter (not shown).

The intra prediction mode information may include, for example, flag information (ex. intra_luma_mpm_flag) indicating whether the most probable mode (MPM) or remaining mode is applied to the current block. In this case, when MPM is applied to the current block, the prediction mode information may further include index information (ex. intra_luma_mpm_idx) indicating one of intra prediction mode candidates (MPM candidates). Intra prediction mode candidates (MPM candidates) may be composed of an MPM candidate list or an MPM list. In addition, when MPM is not applied to the current block, the intra prediction mode information may further include remaining mode information (ex. intra_luma_mpm_remainder) indicating one of intra prediction modes other than intra prediction mode candidates (MPM candidates). there is. The decoding apparatus may determine the intra prediction mode of the current block based on the intra prediction mode information.

In addition, intra prediction type information may be implemented in various forms. For example, intra prediction type information may include intra prediction type index information indicating one of intra prediction types. As another example, the intra prediction type information includes at least one of reference sample line information (ex. intra_luma_ref_idx) indicating whether the MRL is applied to the current block and, if the MRL is applicable, whether a reference sample line is used or not, ISP flag information (ex. intra_subpartitions_mode_flag) indicating whether the ISP is applied to the current block, ISP type information (ex. intra_subpartitions_split_flag) in which subpartitions indicates a partition type when the ISP is applied, flag information indicating whether PDCP is applied, or flag information whether LIP is applied. In addition, the intra prediction type information may include a MIP flag information indicating whether MIP is applied to the current block.

The aforementioned intra prediction mode information and/or intra prediction type information may be encoded/decoded through the coding method described in this document. For example, the aforementioned intra prediction mode information and/or intra prediction type information may be encoded/decoded through entropy coding (eg. CABAC, CAVLC) coding based on truncated (rice) binary code.

Meanwhile, partitioning mode can be used to perform inter prediction.

Figure 10:
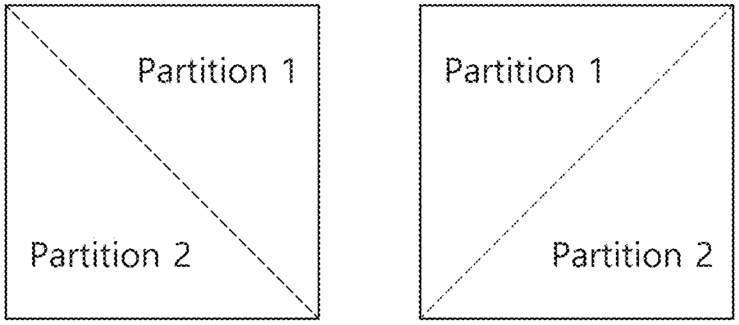
FIG. 10 is a diagram explaining an embodiment of a partitioning mode.

FIG. 10 is a diagram explaining an embodiment of a partitioning mode.

For example, partitioning mode can be used interchangeably with triangle partition mode. For example, the partitioning mode may be referred to as GPM (Geometric Partitioning Mode), GEO or etc, and the triangle partition mode may be referred to as TPM (Triangle Partition mode) or etc.

In one embodiment, triangle partition mode may be used for inter prediction. The triangle partition mode can only be applied to CUs of 8×8 or larger. The triangle partition mode can be signaled using the CU level flag as a type of merge mode along with other merge modes including regular merge mode, MMVD mode, CIIP mode, and subblock merge mode.

When the triangle partition mode is used, as shown in FIG. 10, the CU can be equally divided into two triangle partitions using diagonal partitioning or opposite-diagonal (skew-diagonal) partitioning. Each triangle partition within the CU can be inter predicted based on its own motion information, and only unidirectional prediction can be allowed for each partition. That is, each partition can have one motion vector and one reference index. A triangle partition may be referred to as various terms such as partition, partition region, GPM partition, geometric partition, and the like.

In one embodiment, when the triangle partition mode is used for the current CU, a flag indicating the direction (diagonal or opposite-diagonal) of the triangle partition and two merge indices (one for each partition) may be signaled. The flag may indicate whether the triangle partition is divided based on the upward-right diagonal or the upward-left diagonal. Alternatively, the flag may indicate whether the triangle partition is divided based on the diagonal or opposite-diagonal. Here, the diagonal may represent an upward-right diagonal, and the opposite-diagonal may represent an upward-left diagonal, but are not limited thereto. Additionally, in one embodiment, the maximum number of TPM candidate sizes may be signaled at the slice level, and syntax binarization for the TPM merge index may be specified.

After predicting each triangle partition, sample values located along the upward-right diagonal or upward-left diagonal edge may be adjusted. That is, after predicting each triangle partition, sample values located along a diagonal or opposite-diagonal edge can be adjusted using a blending process with adaptive weights.

In one embodiment, signaling of information related to triangle partition mode may be for the entire CU, and the transform and quantization process may be applied to the entire CU as in other prediction modes. The motion field of the CU predicted using triangle partition mode can be stored in 4×4 units. Triangle partition mode may not be used with subblock transform (SBT). That is, when the value of the signaled triangle mode is 1, cu_sbt_flag can be derived as 0 without signaling.

Figure 11:
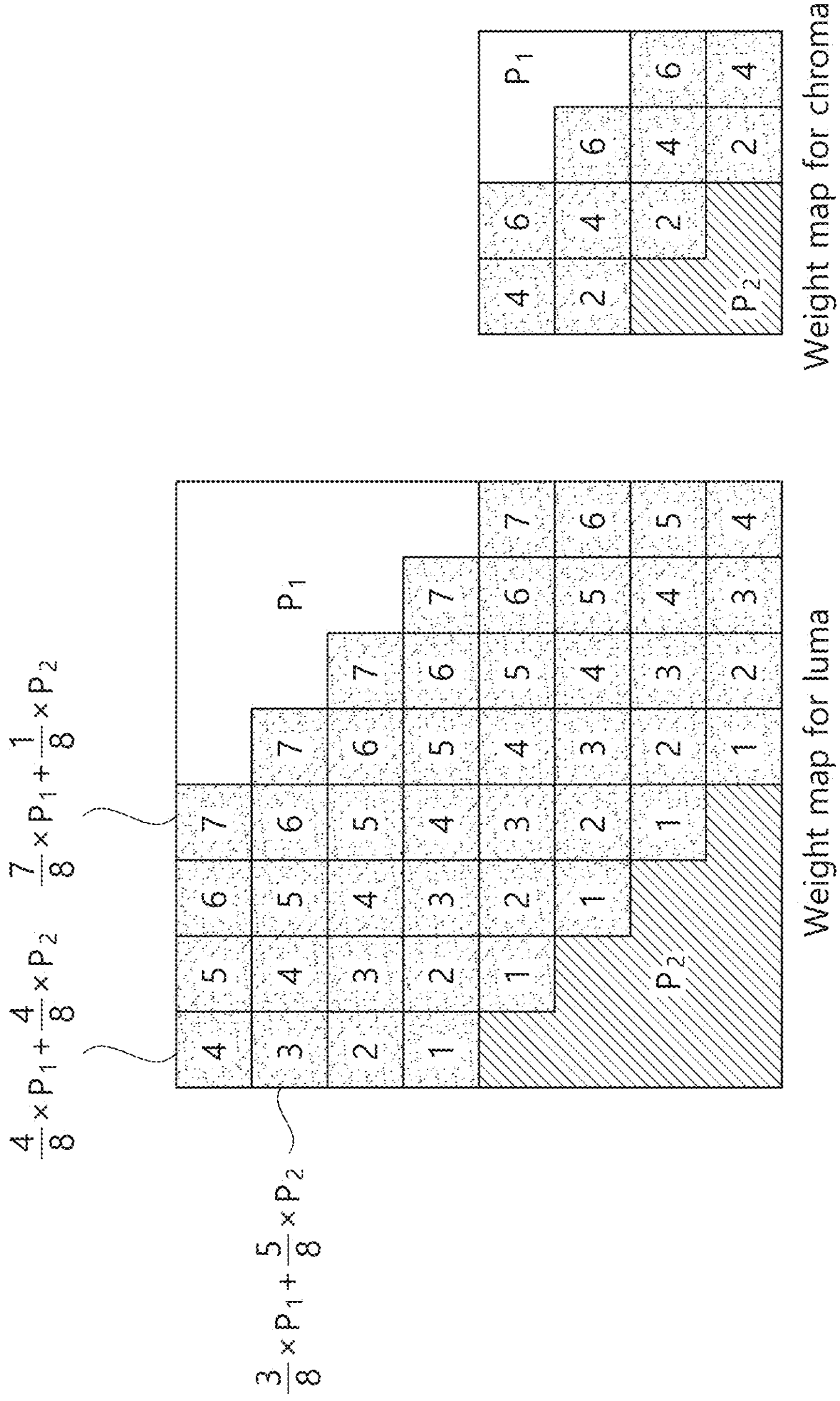
FIG. 11 is a diagram for explaining the blending process of prediction sample values for each partition.

FIG. 11 is a diagram for explaining the blending process of prediction sample values for each triangle partition.

According to one embodiment, after performing prediction based on its own motion information for each triangle partition, to derive samples around the diagonal or opposite-diagonal edge, blending may be applied to the two prediction signals. In other words, after deriving prediction samples for each triangle partition, to derive sample values of samples around a diagonal or opposite-diagonal edge, blending may be applied to the prediction samples of each triangle partition.

According to one embodiment, for the blending process, weights as shown in FIG. 11 may be used. That is, as a weight, {7/8, 6/8, 5/8, 4/8, 3/8, 2/8, 1/8} can be used for the luma block, and {6/8, 4/8, 2/8} can be used for the chroma block. For example, in the case of the upper left sample of the luma block, the sample value can be derived as 4/8*p1+4/8*p2. For example, in the case of a sample located immediately below the upper left sample of the luma block, the sample value may be derived as 3/8*p1+5/8*p2. Here, p1 may be a sample value of the triangle partition located in the bottom left corner of the current block, and p2 may be a sample value of the triangle partition located in the upper right corner of the current block. In other words, for the blending process, a weight based on the distance to each partition can be used. In other words, a larger weight can be assigned to a partition that is closer, and a smaller weight can be assigned to a partition that is farther. The above weight is an example, and the weight that can be used in the blending process can be appropriately modified and used based on the situation.

Meanwhile, the motion vector of the CU coded using triangle partition mode can be stored in 4×4 units. Unidirectional prediction or bidirectional prediction motion vectors can be stored depending on the location of each 4×4 unit. As an example, the unidirectional prediction motion vectors for partition 1 and partition 2 may be denoted as Mv1 and Mv2, respectively. Here, partition 1 and partition 2 may correspond to each triangle partition. If the 4×4 unit is located in the unweighted area of FIG. 9, Mv1 or Mv2 can be stored in the corresponding 4×4 unit. In contrast, when the 4×4 unit is located in the weight area, the bidirectional prediction motion vector can be stored. The bidirectional prediction motion vector can be derived from Mv1 and Mv2 based on the process in Table 3.

TABLE 3

| |
|---|
| 1) If Mv1 and Mv2 are from different reference picture lists (one from L0 and the other from L1), then Mv1 and Mv2 are simply combined to form the bi-prediction motion vector. |
| 2) Otherwise, if Mv1 and Mv2 are from the same list, and without loss of generality, assume they are both from L0. In this case, |
| 2.a) If the reference picture of either Mv2 (or Mv1) appears in L1, then that Mv2 (or Mv1) is converted to a L1 motion vector using that reference picture in L1. Then the two motion vectors are combined to form the bi-prediction motion vector; |
| 2.b) Otherwise, instead of bi-prediction motion, only uni-prediction motion Mv1 is stored. |

That is, if Mv1 and Mv2 are derived from different reference picture lists (for example, one is derived from L0 and the other is from L1), Mv1 and Mv2 may be simply combined to form a bidirectional prediction motion vector.

Otherwise, if Mv1 and Mv2 are derived from the same list and without loss of generality, both Mv1 and Mv2 can form L0. In this case, a) if the reference picture of Mv2 (or Mv1) is present in L1, Mv2 (or Mv1) can be transformed to an L1 motion vector using the reference picture of L1. And the two motion vectors can be merged to form a bidirectional prediction motion vector. b) Otherwise, instead of the bidirectional prediction motion vector, only the unidirectional motion vector Mv1 can be stored.

Figure 12:
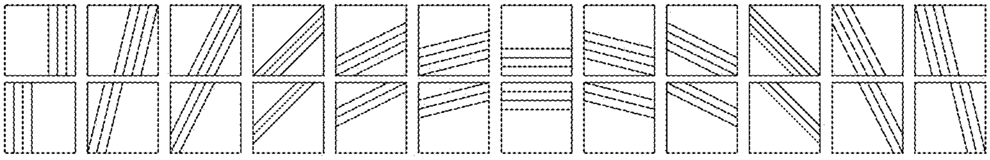
FIG. 12 is a diagram explaining another embodiment of the partitioning mode.

FIG. 12 is a diagram explaining another embodiment of the partitioning mode.

As described above, partitioning mode can be used interchangeably with GPM mode.

For example, GPM mode may be supported for inter prediction. The GPM mode can be signaled using a CU level flag as a type of merge mode along with other merge modes including regular merge mode, MMVD mode, CIIP mode, and subblock merge mode.

In applying the GPM mode, as shown in FIG. 12, the CU may be partitioned in various directions other than the diagonal partition or opposite-diagonal partition. For example, a total of 64 partitions can be supported by GPM mode for each possible CU size. (In total 64 partitions are supported by geometric partitioning mode for each possible CU size.) Possible CU sizes can be (2^m)×(2^n) except 8×64 and 64×8, where m and n are integer equal to or larger than 3 and equal to smaller than 6. In other words, a possible CU size may be a CU size where the width (w) is 2^m and the height (h) is 2^n, with m and n having integer value equal to or larger than 3 and equal to smaller than 6, respectively. However, 8×64 and 64×8 may be excluded from the possible CU sizes.

For example, when the GPM mode is used, the CU may be divided into two parts by a geometrically located straight line. In other words, when the GPM mode is used, the CU may be divided into two geometric partitions by a geometrically located splitting line as shown in FIG. 12. The geometric partition may be referred to as a partition or the like. The location of the splitting line may be mathematically derived from the offset parameters and angles of a particular partition. Each part of the geometric partition within the CU may be inter-predicted based on its own motion information, and only unidirectional prediction may be allowed for each partition. i.e., each partition may have one motion vector and one reference index.

For example, if GPM mode is used for the current CU, a geometric partition index indicating the partition mode (angle and offset) of the geometric partition and two merge indices (one for each partition) may be additionally signaled/parsed. Additionally, for example, the maximum number of GPM candidate sizes can be signaled through SPS, and the syntax binarization for the GPM merge index can be specified.

Meanwhile, DIMD (Decoder Side Intra Mode Derivation, DIMD) mode, a method of intra prediction, can be used to perform prediction for the current block.

In the following, about a DIMD mode, a method of intra prediction, will be discussed.

For example, DIMD modes include Decoder Side Intra Mode Derivation mode, Decoder Intra Mode Derivation mode, Decoder Side Intra Prediction Mode, and Decoder Intra Mode Prediction mode. (Decoder Intra Prediction Mode).

Also, for example, the DIMD mode may be referred to as a DIMD intra mode. Also, the DIMD mode may be referred to as a DIMD intra prediction mode or a DIMD prediction mode.

Also, for example, intra mode may be referred to as intra prediction mode in this document. In addition, intra mode and intra prediction mode may be used interchangeably.

Meanwhile, in existing video codecs such as HEVC and VVC, an intra prediction mode is signaled through a bitstream. The amount of overhead of the intra prediction mode may vary depending on several factors (ie quantization parameters, video characteristics, etc.). Table 4 below shows overhead in intra prediction mode.

TABLE 4

| QP | % of bits used to code INTRA_DIR_ANG Bit | | Division of the % of bits used for Angular Direction | |
|---|---|---|---|---|
| QP22 | INTRA_DIR_ANG Bit | 4.87% | INTRA_DIR_MPM_FLAG Bit | 0.74% |
| | | | INTRA_DIR_LUMA_MPM Bit | 1.61% |
| | | | INTRA_DIR_LUMA_NON_MPM Bit | 1.41% |
| | | | INTRA_DIR_CHROMA Bit | 1.11% |
| QP27 | INTRA_DIR_ANG Bit | 7.19% | INTRA_DIR_MPM_FLAG Bit | 1.16% |
| | | | INTRA_DIR_LUMA_MPM Bit | 2.49% |
| | | | INTRA_DIR_LUMA_NON_MPM Bit | 2.17% |
| | | | INTRA_DIR_CHROMA Bit | 1.37% |
| QP32 | INTRA_DIR_ANG Bit | 9.22% | INTRA_DIR_MPM_FLAG Bit | 1.55% |
| | | | INTRA_DIR_LUMA_MPM Bit | 3.24% |
| | | | INTRA_DIR_LUMA_NON_MPM Bit | 2.89% |
| | | | INTRA_DIR_CHROMA Bit | 1.54% |
| QP37 | INTRA_DIR_ANG Bit | 11.37% | INTRA_DIR_MPM_FLAG Bit | 1.93% |
| | | | INTRA_DIR_LUMA_MPM Bit | 3.91% |
| | | | INTRA_DIR_LUMA_NON_MPM Bit | 3.57% |
| | | | INTRA_DIR_CHROMA Bit | 1.96% |
| Average | INTRA_DIR_ANG Bit | 8.16% | INTRA_DIR_MPM_FLAG Bit | 1.35% |
| | | | INTRA_DIR_LUMA_MPM Bit | 2.81% |
| | | | INTRA_DIR_LUMA_NON_MPM Bit | 2.51% |
| | | | INTRA_DIR_CHROMA Bit | 1.49% |

Referring to Table 4, on average, about 8.15% of bits are used to code the intra prediction mode. Although this represents a statistic derived from the VVC reference software VTM version 10, it should be taken into account that this trend can be observed regardless of the video standard. Also, this trend suggests that the overhead of intra mode signaling is non-negligible.

Meanwhile, unlike the above-described conventional intra prediction mode signaling, a decoder side intra mode derivation (DIMD) method is introduced in this document. Here, DIMD means an intra coding tool in which a luma intra prediction mode (IPM) is not transmitted through a bitstream. Instead, the luma intra prediction mode is derived using previously encoded/decoded pixels in both the encoder and decoder.

For example, the DIMD mode is selected as the best mode in the encoder when the corresponding RD cost is the minimum among all other intra modes. In the decoder, each CU may check whether the DIMD mode is applied. For example, DIMD flag information may be signaled to indicate the DIMD mode. In addition, it may indicate whether the CU derives the DIMD intra mode by another method.

When a CU is coded with DIMD mode, the decoder can derive DIMD intra mode. For example, the DIMD intra mode (or DIMD mode) may be derived during a reconstruction process using previously decoded neighboring pixels. Also, the DIMD mode may be derived using other techniques or other processes.

When the DIMD mode is not selected in the decoder, information on the intra mode that can be parsed from the bitstream may relate to the existing intra mode. For example, the information on the intra mode may be at least one of an MPM flag, an MPM index, or remaining mode information.

For example, the DIMD flag information may be parsed/signaled before the MPM flag. Also, for example, DIMD flag information may be parsed/signaled between MPM flag information and MPM index information. For example, when DIMD flag information is parsed/signaled between MPM flag information and MPM index information, DIMD flag information may be parsed/signaled when the value of MPM flag information is 1.

Figure 13:
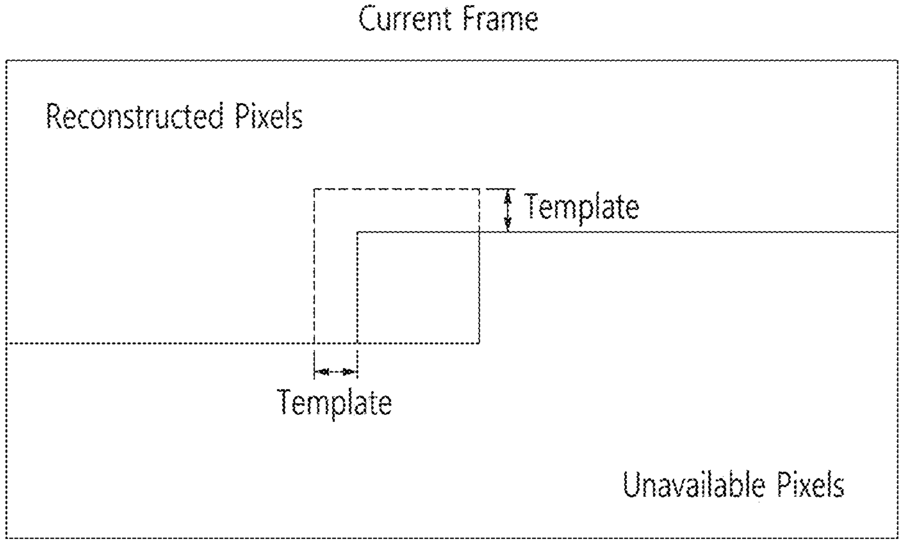
FIG. 13 exemplarily shows a reconstructed pixel template used in DIMD mode.

FIG. 13 exemplarily illustrates a reconstructed pixel template used in DIMD mode.

Referring to FIG. 13, a DIMD mode for a current CU may be derived using a reconstructed pixel template. For example, the DIMD mode may be derived by calculating direction information between reconstructed pixels assuming that the angular direction of the template is highly correlated with the direction of the current block.

For example, the amount of gradients can be used to measure the DIMD mode. In this case, the amount of the gradient may be represented by a histogram. For example, the DIMD mode can be estimated based on intensity and orientation that can be calculated from adjacent reconstructed pixels of the current block. In this case, the intensity may be indicated by G, and the direction may be indicated by O. In this case, the intensity may mean amplitude.

Meanwhile, the Sobel filter may also be called a Sobel operator, and is an efficient filter for edge detection. When using a Sobel filter, there are two types of Sobel filters available: a Sobel filter for vertical direction and a Sobel filter for horizontal direction.

For example, for each pixel in the template, Sobel filters use the window centered at the current pixel to calculate x (i.e., Mx) and y (That is, it can be applied in My) direction.

The Mx and the My can be calculated through the following equation.

$$M_x = \begin{bmatrix} -1 & 0 & 1 \\ -2 & 0 & 2 \\ -1 & 0 & 1 \end{bmatrix} \text{ and } M_y = \begin{bmatrix} -1 & -2 & -1 \\ 0 & 0 & 0 \\ 1 & 2 & 1 \end{bmatrix} \qquad \text{[Equation 1]}$$

In addition, the amplitude and the direction can be calculated through the following equation.

$$G = |G_x| + |G_y| \text{ and } 0 = \operatorname{atan}\left(\frac{G_y}{G_x}\right) \qquad \text{[Equation 2]}$$

The direction of the gradient may be converted into an intra-angular prediction mode. For example, a histogram value in an intra-angle mode may be increased by G, and gradient intensity values for each intra-angle mode may be accumulated. A mode showing the highest peak in the histogram is selected as an intra prediction mode for the current block. For example, a mode showing the highest peak in the histogram may be selected as the DIMD mode for the current block. As another example, two DIMD modes can be derived and included in the MPM list. In this case, the modes representing the highest peak and the second highest peak in the histogram can be derived as DIMD modes. As another example, after deriving a mode representing the highest peak and a mode representing the second highest peak in the histogram, prediction samples may be derived by blending the prediction samples derived from the two modes. Here, the average of the prediction samples may be used for blending of the prediction samples, but the method is not limited to this.

Meanwhile, TIMD (Template based Intra Mode Derivation, TIMD) mode, a method of intra prediction, can be used to predict the current block.

In the following, about a TIMD mode, a method of intra prediction, will be discussed.

Figure 14:
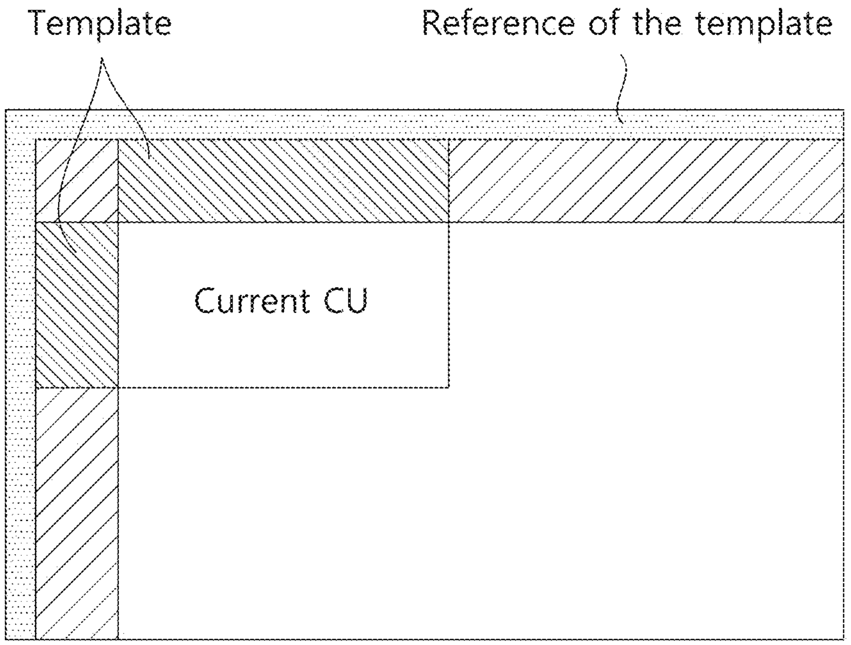
FIG. 14 is a diagram exemplarily illustrating a template used to derive the intra mode of the current block when using TIMD mode.

FIG. 14 is a diagram illustrating a template used to derive the intra mode of the current block when using TIMD mode.

When TIMD mode is used, the decoder may use previously decoded neighboring pixels to derive the intra mode of the current CU. For example, the intra mode of the current block (or current CU) may be derived by deriving prediction samples for the neighboring template based on the neighboring reference samples of the neighboring template of the current block (or current CU), and comparing the derived prediction samples for the neighboring template with the reconstructed samples of the neighboring template. After deriving the SATD (Sum of Absolute Transformed Difference) of the prediction samples derived based on the neighboring reference samples of the neighboring template and the reconstructed samples of the neighboring template, and the mode with the minimum SATD may be selected as the intra mode of the current block.

For example, referring to FIG. 14, prediction samples of the template can be derived based on neighboring reference samples located outside the template, that is, Reference of the template. After deriving the SATD between the prediction sample of the derived template and the reconstructed sample of the template already derived during the reconstruction process, the mode with the minimum SATD can be selected as the intra mode of the current block. Since the template is an area where reconstruction has already been completed in the decoding order, this method can be used.

Or, for example, after selecting the two modes with the minimum SATD (i.e., the mode with the smallest SATD and the mode with the second smallest SATD), by blending the prediction blocks for the two prediction modes, it can be used as the prediction block for the current block. Specifically, after selecting two modes with the minimum SATD, the prediction blocks for the two prediction modes can be blended using a weighted sum method and it can be used as prediction blocks for the current block.

For example, if the smallest SATD multiplied by 2 is greater than the second smallest SATD, blending of the two modes described above can be applied. That is, if the conditions of Equation 3 are satisfied, the blending of the two modes described above can be applied.

$$\text{costMode2} < 2 * \text{costMode1} \qquad \text{[Equation 3]}$$

In Equation 3, CostMode1 may represent the minimum SATD, that is, the smallest SATD, and CostMode2 may represent the second smallest SATD.

If the condition of Equation 3 above is satisfied, a prediction block may be generated by blending the two modes. Otherwise, only one mode with the minimum SATD can be selected.

For example, the ratio of weights used when blending two prediction blocks may be costMode2/(costMode1+costMode2) and 1−weight1, respectively. In other words, the ratio of weights used when blending two prediction blocks may be the same as Equation 4 and Equation 5.

$$\text{weight1} = \text{costMode2}/(\text{costMode1} + \text{costMode2}) \qquad \text{[Equation 4]}$$

$$\text{weight2} = 1 - \text{weight1} \qquad \text{[Equation 5]}$$

Meanwhile, in the conventional GPM mode, signaling/parsing of the prediction mode for each partition area was required. Because of this, there was a problem that the number of bits needed for signaling/parsing the prediction mode for each partition area was required. In addition, in the case of the conventional GPM mode, only inter prediction mode can be used for each partition area. Because of this, there was a problem that the intra prediction mode could not be used even when using the intra prediction mode for each partition area was more effective.

An embodiment of this document proposes a method of generating a prediction block by applying an intra prediction mode to each geometric partition area in the process of generating a prediction block of a geometric partition area to generate a GPM prediction block. Here, the GPM prediction block may refer to a prediction block generated by applying the GPM mode. In other words, one embodiment proposes a method of generating a prediction block by applying the intra prediction mode to a geometric partition area of the GPM, where only the inter prediction mode was previously applied.

Table 5 shows the syntax for the conventional GPM mode.

TABLE 5

| | |
|---|---|
| merge_gpm_partition_idx[ x0 ][ y0 ] | ae(v) |
| merge_gpm_idx0[ x0 ][ y0 ] | ae(v) |
| if( MaxNumGpmMergeCand > 2 ) | |
| merge_gpm_idx1[ x0 ][ y0 ] | ae(v) |

Table 6 shows the information needed to divide one block into two areas in the conventional GPM mode.

TABLE 6

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

Additionally, an embodiment of this document proposes a method of deriving the intra prediction mode of the geometric partition area from the decoder side without separate signaling. In other words, in the case of the existing GPM mode, signaling/parsing of the prediction mode to be applied to each geometric partition area was required, however, according to one embodiment, the intra prediction mode of the geometric partition area is derived at the decoder side without separate signaling. By doing so, coding efficiency can be improved by reducing the amount of data required for signaling/parsing the prediction mode.

Additionally, according to an embodiment of this document, intra blocks can be applied to GPM mode without separate signaling, and thus compression efficiency can be improved by additionally applying new prediction blocks. In addition, according to an embodiment of the present application, by expanding the conventional GPM technology, which was applicable only when there are two or more GEO candidates, so the GPM is applied using inter prediction and intra prediction simultaneously even when there is only one GEO candidate. Thereby, HW bandwidth remains the same, but compression efficiency can be improved. More specifically, in the case of the existing GPM technology, only the inter prediction mode was available, and therefore two GEO candidates related to the inter prediction mode were required. According to one embodiment, since intra prediction mode can be applied to GPM technology, GPM can be applied even when there is one GEO candidate related to inter prediction mode. As mentioned above, GPM and GEO can be used interchangeably.

In the following, about the conventional GPM technology will be briefly reviewed first, and then the embodiment proposed in this document will be described in detail.

The conventional GPM technology signals the syntax of Table 5 and divides one block into two partition areas based on the angle and distance derived using Table 6 based on the signaled GPM index. In Tables 5 and 6 above, the merge_gpm_partition_idx syntax element may indicate a geometric partition index indicating the partition mode (angle and offset) of the geometric partition described above with respect to FIG. 12. In Tables 5 and 6 above, the merge_gpm_idx0 syntax element and the merge_gpm_idx1 syntax element may represent the merge index for each partition described above with reference to FIG. 12. The merge_gpm_idx0 syntax element may be information related to the prediction mode applied to the first partition area, and the merge_gpm_idx1 syntax element may be information related to the prediction mode applied to the remaining partition areas. Prediction samples for each partition area can be generated using different motion prediction information, and the generated prediction samples of each partition area can be blended to generate a prediction block for the current block.

In the case of the conventional GPM technology, only inter prediction was used to generate prediction blocks (or prediction samples) for each of the two partition areas. One embodiment of this document proposes a method of using intra prediction to generate prediction samples for each partition area.

Figure 15:
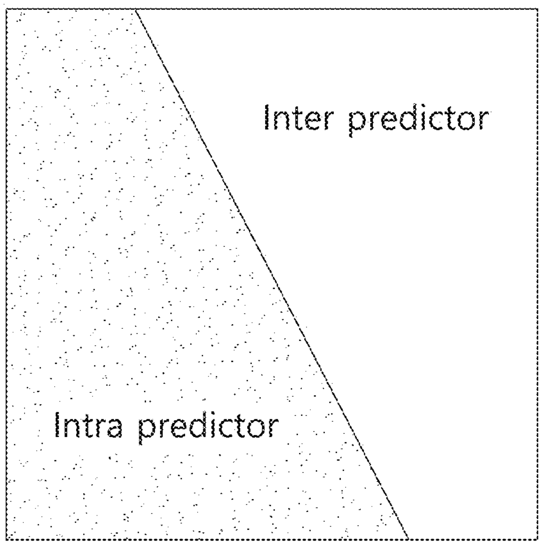
FIG. 15 is an example diagram showing a block to which a GPM mode is applied according to an embodiment.

FIG. 15 is an example diagram showing a block to which a GPM mode is applied according to an embodiment. Referring to FIG. 15, a block to which GPM mode is applied can be divided into two geometric partition areas, and prediction samples can be generated using an intra prediction method for one or more of the two geometric partition areas. In other words, according to one embodiment, a prediction sample may be generated by applying an inter prediction method to one of the two geometric partition areas, and an intra prediction method may be applied to the other area to generate a prediction sample. However, it is not limited to this, and when generating prediction samples for each region (area), various prediction mode combinations such as inter-inter, inter-intra, intra-inter, or and the like can be used. As described above, the prediction block of the corresponding block (current CU or current block) can be generated by blending the prediction samples of each partition area generated in this way.

One embodiment of this document proposes another method for deriving an intra mode for intra prediction applied to a geometric partition area. More specifically, according to one embodiment, an intra prediction mode to be applied to an intra block in the GPM partition area can be derived on the decoder side without signaling/parsing information related to a prediction mode. Here, the intra block refers to a partition area from which prediction samples are derived based on the intra prediction mode among the GPM partition areas.

Figure 16:
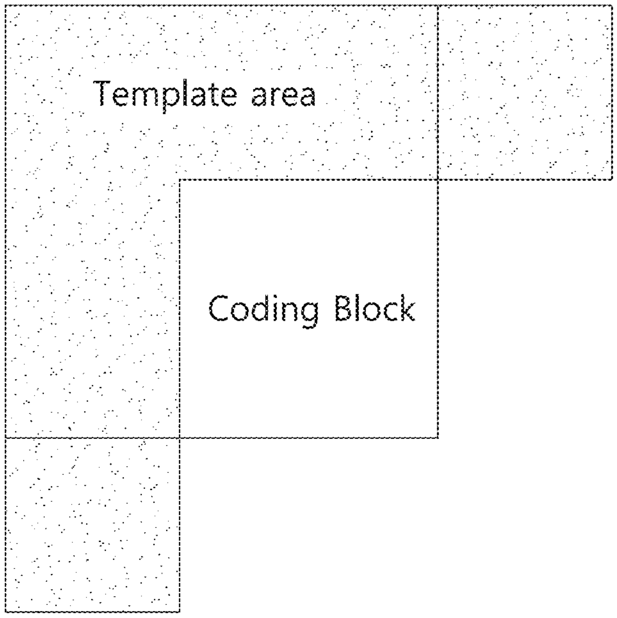
FIG. 16 is a diagram illustrating derivation of an intra mode of a partition area based on template matching of this document.

FIG. 16 is a diagram illustrating derivation of an intra mode of a partition area based on template matching of this document.

According to one embodiment, as shown in FIG. 16, template matching can be used to derive the intra mode of an intra block in the partition area. That is, the intra prediction mode of the template can be derived at the decoder by using the neighboring sample that has already been decoded at the time of coding of the current block as a template, and the prediction sample of the intra block can be generated using the derived intra prediction mode. In other words, the most appropriate intra mode for the area where decoding has already been completed can be derived on the decoder side, and a prediction sample of an intra block in the GPM partition area of the current block can be generated using the derived intra mode. Deriving the intra mode of the intra block and prediction sample based on the template matching is the same as the process of deriving the intra mode and prediction sample using the TIMD mode described above with reference to FIG. 14.

According to another embodiment, a gradient can be used to derive the intra mode of an intra block in the partition area. That is, according to one embodiment, the intra prediction mode can be derived by mapping the mode gradient (i.e., the most common gradient) to an intra prediction mode based on the gradient of the neighboring sample that has already been decoded at the coding time of the current block, and using the derived intra prediction mode a prediction sample of the intra block can be generated. In other words, according to one embodiment, the intra mode can be derived by deriving a gradient for each pixel (or sample) in an area where decoding has already been completed and mapping the mode gradient among the derived gradients to the intra prediction mode. And based on the derived intra mode, a prediction block of the intra block among the GPM partition areas of the current block can be generated. Deriving the intra mode and prediction sample of the intra block based on the gradient of neighboring samples of the current block is the same as the process of deriving the intra mode and prediction sample using the DIMD mode described above with respect to FIG. 13.

As described above, when the intra prediction mode for the intra block is derived at the decoder side, there is no need to signal/parse the intra prediction mode, so there is an effect that efficient coding is available by reducing the amount of data required to represent the intra prediction mode. In other words, in the case of the existing GPM technology, signaling of information to indicate the prediction mode for each partition area was required, but according to one embodiment, signaling of the information to indicate the prediction mode for an intra block among the partition areas becomes unnecessary, thereby, there is an advantage that the number of bits can be reduced.

In the following, a syntax signaling method for supporting GPM mode according to an embodiment of this document will be described.

Table 7 shows a syntax table for signaling information for supporting GPM mode, that is, information related to GPM, according to an embodiment of this document.

TABLE 7

| | |
|---|---|
| { | |
| if(allowGeoIntra) | |
| { | |
| dec_intra_gpm_flag0[ x0 ][ y0 ] | ae(v) |
| if(!forceIntraGpmFlag1 && intra_gpm_flag0[ x0 ][ y0 ] != 1) | |
| dec_intra_gpm_flag1[ x0 ][ y0 ] | ae(v) |
| } | |
| ... | |
| merge_gpm_partition_idx[ x0 ][ y0 ] | |
| ... | |
| if(intra_gpm_flag0[ x0 ][ y0 ] == 0) | |
| merge_gpm_idx0[ x0 ][ y0 ] | ae(V) |
| if(intra_gpin_flag1[ x0 ][ y0 ] == 0 && MaxNumGpmMergeCand > 2) | |
| merge_gpm_idx1[ x0 ][ y0 ] | ae(v) |

Table 8 is a table showing the semantics of the syntax elements included in Table 7 above.

TABLE 8

| |
|---|
| The variable allowGeoIntra is derived as follow: |
| if decoder-side intra predition is allowed, it is derived to be 1 otherwise, it is to be 0 |
| The variable forceIntraGpmFlag1 is derived as follow: |
| 1 : dec_intra_gpm_flag0[ x0 ][ y0 ] = = 0 and (sh_slice_type = = P or MaxNumGpmMergeCand <2) |
| 0 : dec_intra_gpm_flag0[ x0 ][ y0 ] = = 1 |

TABLE 8-continued

| |
|---|
| dec_intra_gpm_flag0[ x0 ][ y0 ] specifies whether the first geometric partitioning region is coded as intra prediction or now. dec_intra_gpm_flag0[ x0 ][ y0 ] is equal to 1, intra prediction is applied for first geometric partitioning region. When it is not present, it is inferred to be 0. |
| dec_intra_gpm_flag1[ x0 ][ y0 ] specifies whether the second geometric partitioning region is coded as intra prediction or now. dec_intra_gpm_flag1[ x0 ][ y0 ] is equal to 1, intra prediction is applied for second geometric partitioning region. When it is not present, it is inferred as following |
| - if allowGeoIntra is equal to 0, it is inferred to be 0 |
| - otherwise if, dec_intra_gpm_flag0[ x0 ][ y0 ] is equal to 1, it is inferred to be 0 |
| - otherwise if, forceIntraGpmFlag1 is equal to 1, it is inferred to be 1. |
| - otherwise, it is inferred to be 0. |

Referring to Tables 7 and 8 above, when the intra GPM mode is allowed, that is, when the variable allowGeoIntra is true, the first intra GPM flag information can be signaled/parsed. The variable allowGeoIntra can indicate whether intra GPM mode is allowed. The intra GPM mode may mean a GPM mode using the intra mode. The intra GPM mode may be referred to by various terms such as GPM inter-intra mode, and the like. The first intra GPM flag information may be represented as a syntax element dec_intra_gpm_flag0. The syntax element dec_intra_gpm_flag0 can be used interchangeably with intra_gpm_flag0. The first intra GPM flag information may specify whether the first GPM partition area of the current block is coded in intra prediction mode. For example, when the value of the first intra GPM flag information is 1, intra prediction is applied to the first GPM partition area. If the first intra GPM flag information is not present, its value may be inferred to be 0. Here, the first GPM partition area may be one of the GPM partition areas included in the current block. For example, the current block to which GPM mode is applied may be divided into a first GPM partition area and a second GPM partition area. The GPM partition area may be referred to by various terms such as partition area, geometric partition, or geometric partition area, and the like.

For example, if the value of forceIntraGpmFlag1 is not equal to 1 and the value of the first intra GPM flag information is not equal to 1, the second intra GPM flag information may be signaled/parsed. The second intra GPM flag information may be represented by a syntax element dec_intra_gpm_flag1. The syntax element dec_intra_gpm_flag1 can be used interchangeably with intra_gpm_flag1. The forceIntraGpmFlag1 may be a variable indicating whether to force the prediction mode to be applied to the second GPM partition area to be intra mode.

For example, the value of forceIntraGpmFlag1 may be derived as equal to 1 when the value of the first intra GPM flag information is equal to 0 and the slice type is P slice. In the case of P slice, 1 inter prediction can be used, so, if intra GPM mode is used for the current block and the first GPM partition area is not coded in intra mode, the second GPM partition area has no choice but to be coded in intra mode. For this reason, the value of the forceIntraGpmFlag1 is derived as equal to 1.

Additionally, for example, the value of forceIntraGpmFlag1 may be derived as 1 when the value of the first intra GPM flag information is 0 and the maximum number of GPM merge candidates is less than 2. The number of GPM merge candidates should be 2 or more to use 2 inter prediction modes. If the maximum number of GPM merge candidates is less than 2, at least one of the first GPM partition area or the second GPM partition area is coded in intra prediction mode. Therefore, if the maximum number of GPM merge candidates is less than 2, intra GPM mode is used for the current block, and the first GPM partition area is not coded in intra mode, the second GPM partition area has no choice but to be coded in intra mode, so the value of the forceIntraGpmFlag1 is derived as equal to 1.

Alternatively, for example, when the value of the first intra GPM flag information is 1, the value of forceIntraGpmFlag1 may be derived as 0.

For example, the second intra GPM flag information may specify whether the second GPM partition area of the current block is coded in intra prediction mode. For example, if the value of the second intra GPM flag information is 1, intra prediction is applied to the second GPM partition area. If the second intra GPM flag information is not present, its value can be derived as follows.

If the value of allowGeoIntra is 0, the value of the second intra GPM flag information can be derived as 0.

Otherwise, if the value of the first intra GPM flag information is 1, the value of the second intra GPM flag information may be derived as 0.

Otherwise, if the value of forceIntraGpmFlag1 is 1, the value of the second intra GPM flag information may be derived as 1.

Otherwise, the value of the second intra GPM flag information may be derived as 0.

Here, the signaling/parsing of the second intra GPM flag information is determined based on the value of forceIntraGpmFlag1 and the value of the first intra GPM flag information because the signaling/parsing of the second intra GPM flag information is unnecessary if the second partition region is necessarily in intra prediction mode or if the second partition region is necessarily in inter prediction mode. According to one embodiment, if signaling/parsing of the second intra GPM flag information is unnecessary, the signaling/parsing of the second intra GPM flag information may be omitted to reduce the amount of data.

For example, if the value of the first intra GPM flag information is 0 and the slice type of the current slice is P slice, the first partition area is coded by inter prediction, so the second partition area must be an intra block. Therefore, in this case, since the second intra GPM flag is unnecessary, signaling/parsing of the second intra GPM flag information is omitted to maximize compression efficiency. In other words, when the value of forceIntraGpmFlag1 is 1 according to the above-described condition, that is, when the second partition area is forced as an intra block, signaling/parsing of the second intra GPM flag information is omitted. Alternatively, when the value of the first intra GPM flag information is 1, the first partition area is an intra block, so the second partition area must be an inter block to which the inter prediction mode is applied. For this reason, signaling/parsing of the second intra GPM flag information is omitted.

Through this, signaling/parsing of unnecessary information can be omitted. Therefore, according to one embodiment, there is an advantage that compression efficiency can be maximized by omitting signaling/parsing of unnecessary information.

Additionally, for example, a GPM partition index indicating the partition mode (angle and offset) of the GPM partition may be signaled/parsed. GPM partition index may be referred to interchangeably with GPM partition index, geometric partition index, or partition index information, and the like. For example, a GPM partition index may include a syntax element merge_gpm_partition_idx.

Additionally, for example, when the value of the first intra GPM flag information is 0, the first merge GPM index information may be signaled/parsed. That is, if the first partition area is not an intra block, the first merge GPM index information required to indicate the inter prediction mode of the first partition area may be signaled/parsed. For example, the first merge GPM index information may include a syntax element merge_gpm_idx0. The first merge GPM index information may be information related to the inter prediction mode applied to the first GPM partition area. In other words, the first merge GPM index information may be information related to the first merge candidate for GPM.

For example, if the value of the second intra GPM flag information is 0 and the maximum number of GPM merge candidates is greater than 2, second merge GPM index information may be signaled/parsed. That is, if the second partition area is not an intra block and the maximum number of GPM merge candidates is greater than 2, the second merge GPM index information required to indicate the inter prediction mode of the second partition area can be signaled/parsed. For example, the second merge GPM index information may include a syntax element merge_gpm_idx1. The second merge GPM index information may be information related to the inter prediction mode applied to the second GPM partition area. In other words, the second merge GPM index information may be information related to the second merge candidate for GPM.

Table 9 shows an syntax table for signaling information for supporting the GPM mode, that is, information related to GPM according to another embodiment of this document.

TABLE 9

```
{
  if(allowGeoIntra)
  {
    dec_intra_gpm_flag0[ x0 ][ y0 ]                                          ae(v)
    if(!forceIntraGpmFlag1 && intra_gpm_flag0[ x0 ][ y0 ] != 1)
      dec_intra_gpm_flag1[ x0 ][ y0 ]                                        ae(v)
  }
  ...
  merge_gpm_partition_idx[ x0 ][ y0 ]
  ...
  if(intra_gpm_flag0[ x0 ][ y0 ] == 0)
    merge_gpm_idx0[ x0 ][ y0 ]                                               ae(v)
  if(intra_gpm_flag1[ x0 ][ y0 ] == 0 && MaxNumGpmMergeCand > 2
|| ( intra_gpm_flag0[ x0 ][ y0 ] == 1 && MaxNumGpmMergeCand > 1 ) )
    merge_gpm_idx1[ x0 ][ y0 ]                                               ae(v)
```

One embodiment proposes a method for minimizing the bits occupied by merge candidate index information for indicating the inter prediction mode of a partition area to which the inter prediction mode is applied in the current block to which GPM is applied. According to one embodiment, whether intra prediction is performed in the first partition area and the maximum number of GPM merge candidates can be considered as a condition for signaling/parsing the second merge GPM index information related to the inter prediction mode of the second partition area.

More specifically, referring to Table 9, when the value of the second intra GPM flag information is 0 and the maximum number of GPM merge candidates is greater than 2, the second merge GPM index information may be signaled/parsed. This is as described above in relation to Table 8.

Additionally, referring to Table 9, if the first intra GPM flag is 1 and the maximum number of GPM merge candidates is greater than 1, the second merge GPM index information may be signaled/parsed. That is, if the first partition area is an intra block and the maximum number of GPM merge candidates is greater than 1, the second merge GPM index information can be signaled/parsed.

For example, it is in consideration of that if the first partition area is an intra block and the maximum number of GPM merge candidates is 1, there is only one GPM merge candidate that can indicate the inter prediction mode of the second partition area, so that the candidate is to be applied as the inter prediction mode of the second partition area, thereby, it is not necessary to signal/parse the second merge GPM index information. On the other hand, if the first partition area is an intra block and the maximum number of GPM merge candidates is greater than 1, which GPM merge candidate is used to derive the inter prediction mode to be applied to the second partition area should be indicated. Therefore, in this case, signaling/parsing of the second merge GPM index information is required.

Also, for example, for the current block to which intra GPM is applied, if the first intra GPM flag is 0, the first partition area is an inter block, so the second partition area should be an intra block, thereby, signaling/parsing of the second merge GPM index information is unnecessary.

As described above, according to one embodiment herein, if signaling/parsing of the second merge GPM index information, which is information related to the inter prediction mode of the second partition region, is not required, it is advantageous to omit signaling/parsing of the second merge GPM index information to save the number of the bits and maximize coding efficiency.

As described above, according to an embodiment of this document, it is possible to prevent the case where both the first partition area and the second partition area are coded with intra prediction. In other words, according to an embodiment of this document, it is possible to prevent the case where intra mode is applied to both partitions divided to apply GPM mode.

Figure 17:
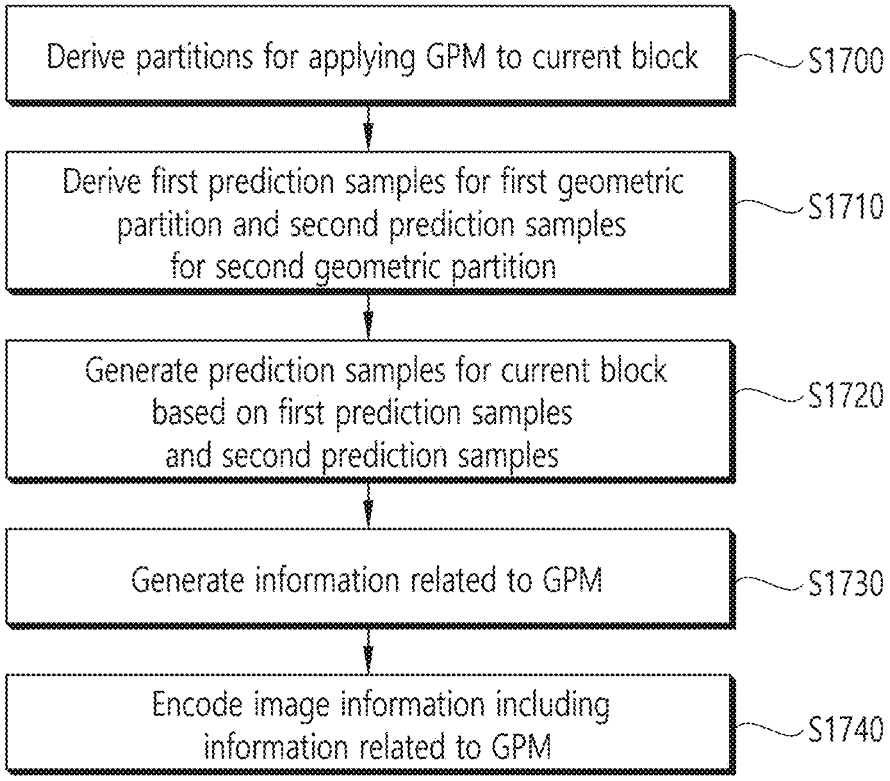
FIGS. 17 and 18 schematically illustrate an example of a video/image encoding method and related components according to an embodiment in this document.
Figure 18:
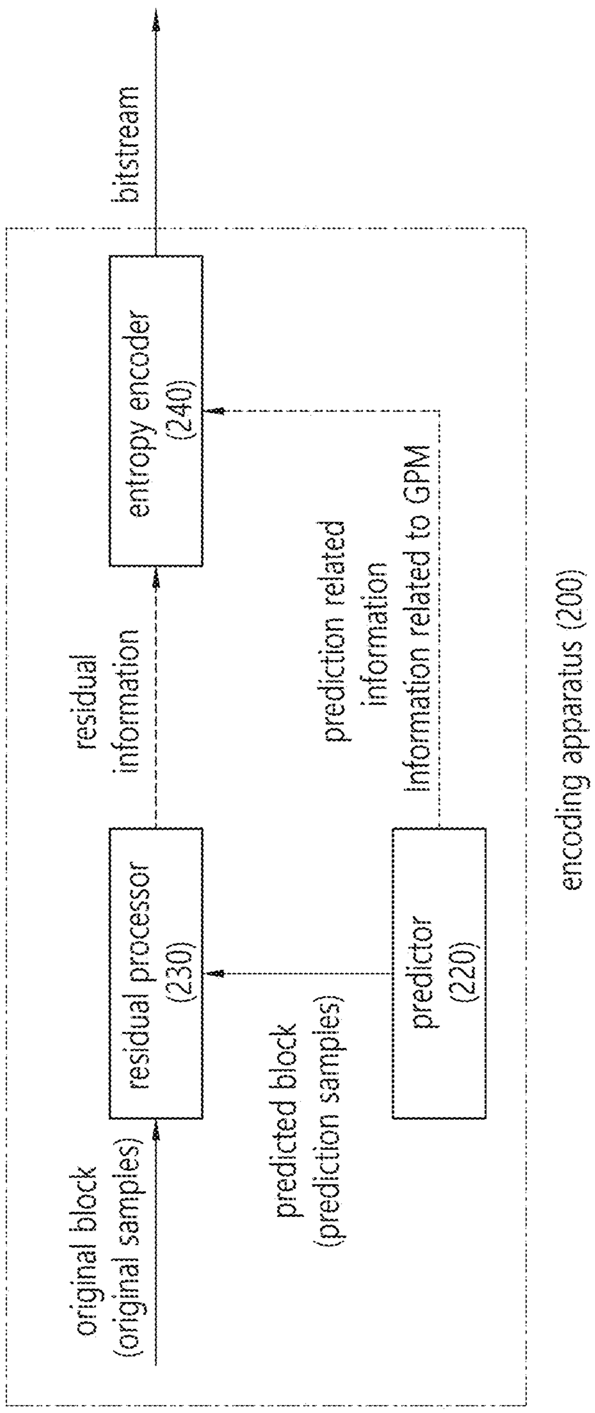

FIGS. 17 and 18 schematically show an example of a video/image encoding method and related components according to an embodiment of this document.

The method disclosed in FIG. 17 may be performed by the encoding apparatus disclosed in FIG. 2 or FIG. 18. Specifically, for example, S1700 to S1730 of FIG. 17 may be performed by the predictor 220 of the encoding apparatus of FIG. 18, and S1740 may be performed by the entropy encoder 240 of the encoding apparatus of FIG. 18. In addition, in FIG. 17, prediction samples or prediction related information may be derived by the predictor 220 of the encoding apparatus, and bitstream may be generated based on residual information or prediction related information by the entropy encoder 240 of the encoding apparatus. The method disclosed in FIG. 17 may include the embodiments described above in this document.

Referring to FIG. 17, the encoding apparatus can derive partitions for applying geometric partitioning mode (GPM) to the current block (S1700). For example, the encoding apparatus may derive partitions for applying GPM to the current block according to the above-described embodiment. The current block may be divided into 2 partitions. For example, the partitions may include a first geometric partition and a second geometric partition. In other words, the current block may be divided into a first geometric partition and a second geometric partition.

The encoding apparatus may derive first prediction samples for the first geometric partition and second prediction samples for the second geometric partition (S1710). For example, the encoding apparatus may derive first prediction samples for the first geometric partition and derive second prediction samples for the second geometric partition according to the above-described embodiment.

For example, an intra prediction may be applied to a portion among the first geometric partition or the second geometric partition. More specifically, it can be determined whether the intra prediction is allowed to be applied for a portion among the first geometric partition or the second geometric partition. This may correspond to checking the variable allowGeoIntra in Table 7 through Table 9. If it is determined that it is allowed for the intra prediction to be applied for a portion among the first geometric partition or the second geometric partition, for example, the intra prediction may be applied for one of the first geometric partition or the second geometric partition. In other words, when deriving the first prediction samples for the first geometric partition and the second prediction samples for the second geometric partition, intra prediction may be performed for one of the first geometric partition or the second geometric partition.

The encoding apparatus may generate prediction samples for the current block based on the first prediction samples and the second prediction samples (S1720). For example, the encoding apparatus may generate prediction samples for the current block based on the first prediction samples and the second prediction samples according to the above-described embodiment.

The encoding apparatus may generate information related to GPM (S1730). For example, the encoding apparatus may generate information related to the GPM for the current block according to the above-described embodiment.

For example, the information related to the GPM may include first intra GPM flag information specifying whether the first geometric partition is coded by intra prediction.

For example, based on a case that a value of the first intra GPM flag information is 1, inter prediction may be applied to the second geometric partition. In other words, based on a case that the intra prediction is applied to the first geometric partition, inter prediction may be applied to the second geometric partition.

For example, based on a case that a value of the first intra GPM flag information is 1, the second intra GPM flag information specifying whether the second geometric partition is coded by intra prediction may not be included in the information related to the GPM.

For example, based on a case that a value of specific flag information is not equal to 1 and a value of the first intra GPM flag information is not equal to 1, the information related to the GPM may include a second intra GPM flag information specifying whether the second geometric partition is coded in an intra prediction. The specific flag information may mean forceIntraGpmFlag1 in Tables 7 and 9. That is, the specific flag information may be a variable indicating whether to force the prediction mode to be applied to the second geometric partition area to be an intra mode.

For example, based on a case that a value of the first intra GPM flag information is 0 and the slice type of the current slice is P slice, a value of the specific flag information may be derived as 1. For example, based on a case that the value of the first intra GPM flag information is 1, the value of the specific flag information may be derived as 0.

For example, based on a case that a value of specific flag information is not equal to 1 and a value of the first intra GPM flag information is not equal to 1, the information related to the GPM may include second intra GPM flag information specifying whether the second geometric partition is coded by an intra prediction.

For example, based on a case that a value of the first intra GPM flag information is 0 and the maximum number of GPM merge candidates is less than 2, a value of the specific flag information may be derived as 1. For example, based on a case that the value of the first intra GPM flag information is 1, the value of the specific flag information may be derived as 0.

For example, when the information related to the GPM does not include the second intra GPM flag information, a value of the second intra GPM flag information can be derived as follows.

For example, based on a first case that it is determined that the intra prediction is not allowed to be applied to one of the first geometric partition or the second geometric partition, the value of the second intra GPM flag information can be derived as 0. For example, based on a second case that does not correspond to the first case and in which the value of the first intra GPM flag information is 1, the value of the second intra GPM flag information may be derived as 0. For example, based on a third case that does not correspond to the first case and the second case and in which the value of the specific flag information is 1, the value of the second intra GPM flag information may be derived as 0. For example, based on a case that does not correspond to the first case, the second case, and the third case, the value of the second intra GPM flag information may be derived as 0.

For example, based on a case that a value of the first intra GPM flag information is 1, the information related to the GPM may include first merge GPM index information related to the first merge candidate for the GPM.

For example, based on a case that a value of the second intra GPM flag information is 0 and the maximum number of GPM merge candidates is greater than 2, the information related to the GPM may include second merge GPM index information related to the second merge candidate for the GPM. Or, for example, based on a case that a value of the first intra GPM flag information is 1 and the maximum number of GPM merge candidates is greater than 1, the information related to the GPM may include second merge GPM index information related to the second merge candidate for the GPM.

The encoding apparatus may derive residual samples for the current block based on prediction samples for the current block. For example, the encoder apparatus may derive residual samples for the current block based on prediction samples for the current block according to the above-described embodiment.

The encoding apparatus can generate residual information based on residual samples. For example, the encoding apparatus may generate residual information based on residual samples according to the above-described embodiment.

The encoding apparatus may encode image information including information related to GPM and residual information (S1740). For example, the encoding apparatus may encode image information including information related to GPM and the residual information according to the above-described embodiment. For example, the information related to the GPM may include the information included in Tables 7 to 9. For example, the information related to the GPM may include first intra GPM flag information, second intra GPM flag information, and specific flag information. The information related to the GPM may include partition index information. Additionally, the information related to the GPM may include first merge GPM index information and second merge GPM index information.

Figure 19:
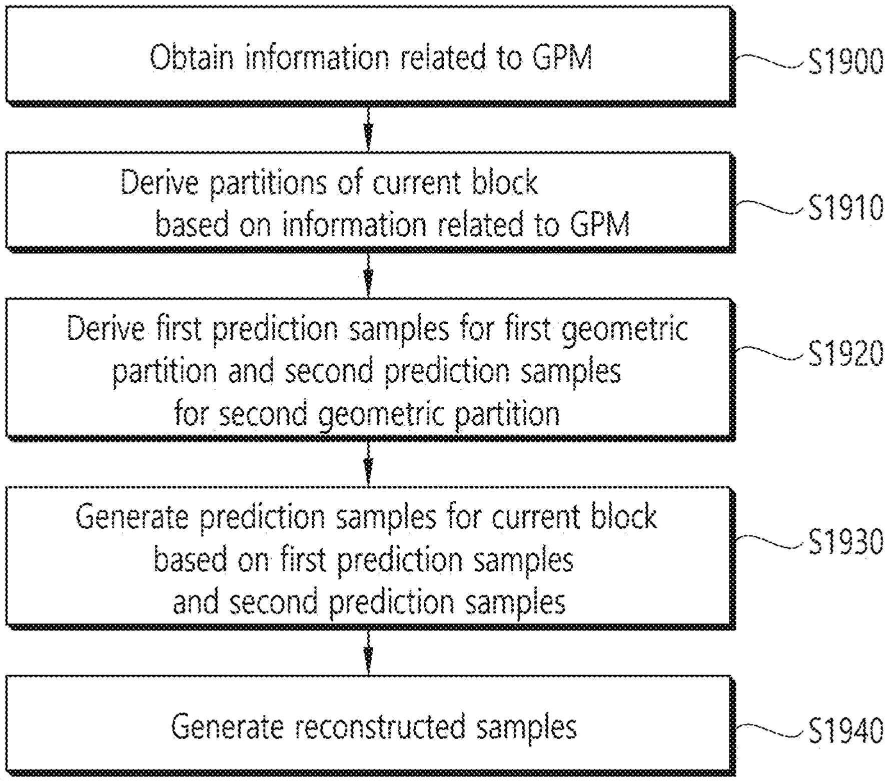
FIGS. 19 and 20 schematically illustrate an example of a video/image decoding method and related components according to an embodiment in this document.
Figure 20:
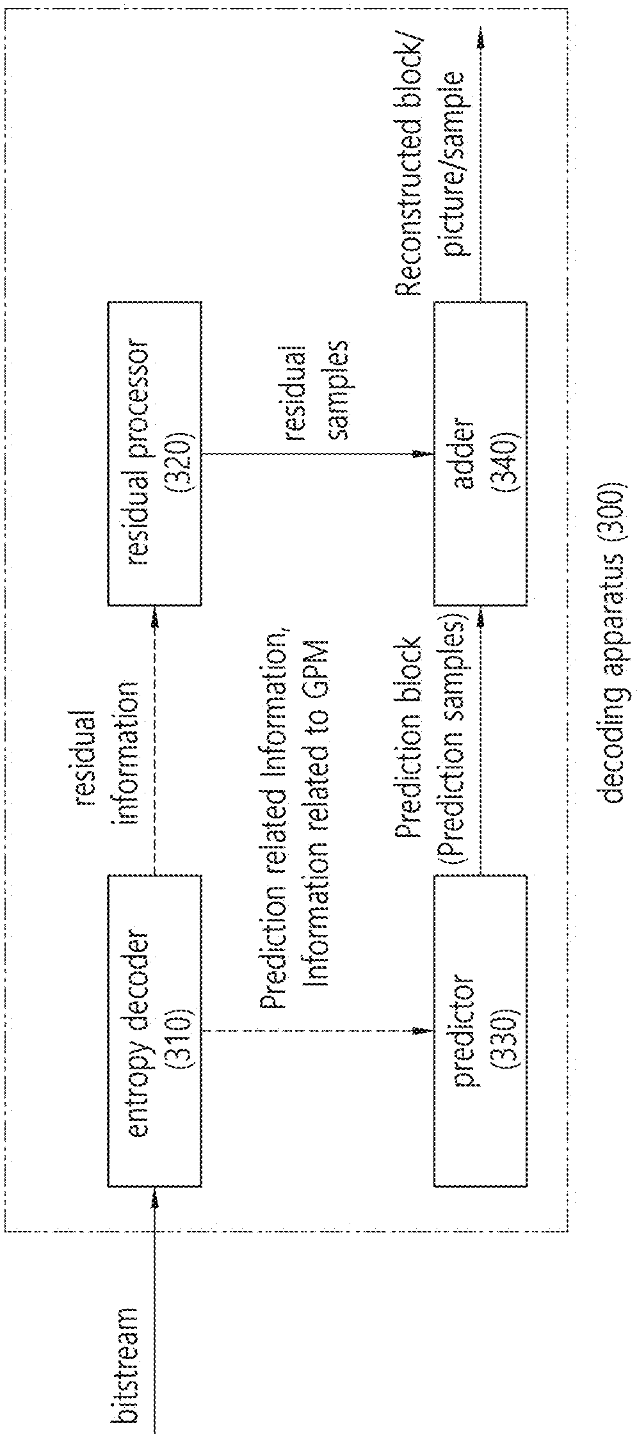

FIGS. 19 and 20 schematically show an example of a video/image decoding method and related components according to an embodiment of this document.

The method disclosed in FIG. 19 may be performed by the decoding apparatus disclosed in FIG. 3 or FIG. 20. Specifically, for example, S1900 of FIG. 19 may be performed by the entropy decoder 310 of the decoding apparatus, S1910 to S1930 of FIG. 19 may be performed by the predictor 310 of the decoding apparatus, and S1940 of FIG. 19 may be performed by the adder 340 of the decoding apparatus. The method disclosed in FIG. 19 may include the embodiments described above in this document.

Referring to FIG. 19, the decoding apparatus can obtain information related to the geometric partitioning mode (GPM) (S1900). For example, the decoding apparatus may obtain information related to the GPM for the current block from the bitstream according to the above-described embodiment. For example, the information related to the GPM may include information included in Table 7 and Table 9. For example, the information related to the GPM may include first intra GPM flag information, second intra GPM flag information, and specific flag information. The information related to the GPM may include partition index information. Additionally, the information related to the GPM may include first merge GPM index information and second merge GPM index information.

The decoding apparatus may derive partitions of the current block based on information related to the GPM (S1910). For example, the decoding apparatus may derive partitions of the current block based on information related to GPM according to the above-described embodiment. More specifically, the decoding apparatus may derive partitions of the current block based on partition index information in the information related to the GPM. The current block may be divided into 2 partitions. For example, the partitions may include a first geometric partition and a second geometric partition. In other words, the current block may be divided into a first geometric partition and a second geometric partition.

The decoding apparatus may derive first prediction samples for the first geometric partition and second prediction samples for the second geometric partition (S1920). For example, the decoding apparatus may derive first prediction samples for the first geometric partition and derive second prediction samples for the second geometric partition according to the above-described embodiment.

For example, an intra prediction may be applied to a portion among the first geometric partition or the second geometric partition. More specifically, it can be determined whether the intra prediction is allowed to be applied for a portion among the first geometric partition or the second geometric partition. This may correspond to checking the variable allowGeoIntra in Table 7 through Table 9. If it is determined that it is allowed for the intra prediction to be applied for a portion among the first geometric partition or the second geometric partition, for example, the intra prediction may be applied for one of the first geometric partition or the second geometric partition. In other words, when deriving the first prediction samples for the first geometric partition and the second prediction samples for the second geometric partition, intra prediction may be performed for one of the first geometric partition or the second geometric partition.

For example, the decoding apparatus may parse first intra GPM flag information specifying whether the first geometric partition is coded by intra prediction. In other words, first intra GPM flag information specifying whether the first geometric partition is coded by intra prediction may be included in the information related to the GPM.

For example, based on a case that a value of the first intra GPM flag information is 1, inter prediction may be applied to the second geometric partition. In other words, based on a case that the intra prediction is applied to the first geometric partition, inter prediction may be applied to the second geometric partition.

For example, based on a case that a value of the first intra GPM flag information is equal to 1, the second intra GPM flag information specifying whether the second geometric partition is coded by an intra prediction may not be parsed. In other words, based on a case that the value of the first intra GPM flag information is equal to 1, the second intra GPM flag information specifying whether the second geometric partition is coded by an intra prediction may not be included in the information related to the GPM.

For example, the obtaining the information related to the GPM (S1900) may include parsing a second intra GPM flag information specifying whether the second geometric partition is coded by an intra prediction, based on a value of the specific flag information not being equal to 1 and a value of the first intra GPM flag information not being equal to 1. In other words, based on a case that a value of specific flag information is not equal to 1 and a value of the first intra GPM flag information is not equal to 1, the information related to the GPM may include a second intra GPM flag information specifying whether the second geometric partition is coded in an intra prediction. The specific flag information may mean forceIntraGpmFlag1 in Tables 7 and 9. That is, the specific flag information may be a variable indicating whether to force the prediction mode to be applied to the second geometric partition area to be an intra mode.

For example, based on a case that a value of the first intra GPM flag information is 0 and the slice type of the current slice is P slice, a value of the specific flag information may be derived as 1. For example, based on a case that the value of the first intra GPM flag information is 1, the value of the specific flag information may be derived as 0.

For example, the obtaining the information related to the GPM (S1900) may include parsing a second intra GPM flag information specifying whether the second geometric partition is coded by an intra prediction, based on a value of the specific flag information not being equal to 1 and a value of the first intra GPM flag information not being equal to 1. In other words, based on a case that a value of specific flag information is not equal to 1 and a value of the first intra GPM flag information is not equal to 1, the information related to the GPM may include second intra GPM flag information specifying whether the second geometric partition is coded by an intra prediction.

For example, based on a case that a value of the first intra GPM flag information is 0 and the maximum number of GPM merge candidates is less than 2, a value of the specific flag information may be derived as 1. For example, based on a case that the value of the first intra GPM flag information is 1, the value of the specific flag information may be derived as 0.

For example, when the information related to the GPM does not include the second intra GPM flag information, that is, when the second intra GPM flag information is not parsed, a value of the second intra GPM flag information can be derived as follows.

For example, based on a first case that it is determined that the intra prediction is not allowed to be applied to one of the first geometric partition or the second geometric partition, the value of the second intra GPM flag information can be derived as 0. For example, based on a second case that does not correspond to the first case and in which the value of the first intra GPM flag information is 1, the value of the second intra GPM flag information may be derived as 0. For example, based on a third case that does not correspond to the first case and the second case and in which the value of the specific flag information is 1, the value of the second intra GPM flag information may be derived as 0. For example, based on a case that does not correspond to the first case, the second case, and the third case, the value of the second intra GPM flag information may be derived as 0.

For example, based on a case that a value of the first intra GPM flag information is 1, the information related to the GPM may include first merge GPM index information related to the first merge candidate for the GPM.

For example, based on a case that a value of the second intra GPM flag information is 0 and the maximum number of GPM merge candidates is greater than 2, the information related to the GPM may include second merge GPM index information related to the second merge candidate for the GPM. Or, for example, based on a case that a value of the first intra GPM flag information is 1 and the maximum number of GPM merge candidates is greater than 1, the information related to the GPM may include second merge GPM index information related to the second merge candidate for the GPM.

For example, as an intra prediction mode for the intra prediction applied to one of the first geometric partition or the second geometric partition, an intra prediction mode derived based on Template based Intra Mode Derivation (TIMD) may be used. For example, the intra prediction mode derived based on the TIMD may be an intra prediction mode of the current block derived based on a template. For example, the template may comprise neighboring samples of the current block. For example, the neighboring samples may be reconstructed samples.

For example, as an intra prediction mode for the intra prediction applied to one of the first geometric partition or the second geometric partition, an intra prediction mode derived based on decoder side intra mode derivation (DIMD) may be used. For example, the intra prediction mode derived based on the DIMD may be derived based on a gradient of the neighboring samples of the current block. For example, the neighboring samples may be reconstructed samples. For example, the intra prediction mode derived based on the DIMD may be derived based on the mode gradient (i.e., the most frequent gradient) of the gradients of the neighboring samples.

The decoding apparatus may generate prediction samples for the current block based on the first prediction samples and the second prediction samples (S1930). For example, the decoding apparatus may generate prediction samples for the current block based on the first prediction samples and the second prediction samples according to the above-described embodiment.

The decoding apparatus may generate reconstructed samples based on prediction samples for the current block (S1940). For example, the decoding apparatus may generate reconstructed samples based on prediction samples for the current block according to the above-described embodiment (S1940).

According to one embodiment of the present disclosure, in applying GPM, by allowing intra prediction unlike the conventional method of allowing inter prediction only, the prediction performance can be improved.

Furthermore, according to one embodiment of the present disclosure, by allowing intra prediction modes of various angles (or directions) in GPM mode, prediction performance can be improved. Specifically, the use of intra prediction modes of various angles (or directions) may be allowed, in addition to intra prediction modes corresponding to directions perpendicular to or parallel to the splitting angle of the splitting line dividing the partition of the current block. In other words, according to an embodiment of this document, prediction performance can be improved by using an intra prediction mode that reflects spatial similarity as much as possible.

According to one embodiment of the present disclosure, as described above, in relation to GPM mode, by preventing signaling/parsing of the information of which signaling/parsing is unnecessary, the number of bits can be reduced and coding efficiency and prediction performance can be improved. Specifically, according to one embodiment of the present disclosure, signaling/parsing of the second intra GPM flag information and the second merge GPM index information may be prevented when signaling/parsing of the second intra GPM flag information and the second merge GPM index information is unnecessary.

According to one embodiment of the present disclosure, it is possible to prevent both the first partition region and the second partition region from being coded in intra prediction. In other words, according to one embodiment of the present disclosure, there is an effect of preventing a case where intra mode is applied to both of the 2 partitions divided to apply GPM mode.

According to one embodiment of the present document, since the intra prediction mode for the intra block can be derived at the decoder side, there is no need to signal/parse information indicating the intra prediction mode, which has the effect of reducing the amount of data required to signal/parse information indicating the intra prediction mode, thereby enabling efficient coding. In other words, in the case of the conventional GPM technology, signaling of information to indicate the prediction mode for each of the partition regions is required, but according to the above embodiment, signaling/parsing of information to indicate the prediction mode for the intra block among the partition regions is unnecessary, which has the advantage of reducing the number of bits.

Meanwhile, a bitstream including image information generated by the above-described encoding method may be stored in a computer readable storage medium. Additionally, data for images/videos can be transmitted through a transmitting apparatus. For example, the data for the image/video may be transmitted to a decoding apparatus through a transmitting apparatus. More specifically, the transmitting apparatus can obtain a bitstream generated by the above-described encoding method and transmit the data comprising the bitstream.

In the above-described embodiment, the methods are described based on the flowchart having a series of steps or blocks. The disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the embodiments of this document may be implemented in the form of software, and the encoding apparatus and/or decoding apparatus according to this document may be included in, for example, a TV, computer, smartphone, set-top box, display device, etc. that that performs the processing.

When the embodiments in this document are implemented as software, the above-described method may be implemented as a module (process, function, etc.) that performs the above-described functions. A module can be stored in memory and executed by a processor. The memory may be internal or external to the processor, and may be coupled with the processor in a variety of well-known means. A processor may include an application-specific integrated circuit (ASIC), other chipsets, logic circuits, and/or data processing devices. Memory may include read-only memory (ROM), random access memory (RAM), flash memory, memory cards, storage media, and/or other storage devices. That is, the embodiments described in this document may be implemented and performed on a processor, microprocessor, controller, or chip. For example, functional units shown in each drawing may be implemented and performed on a computer, processor, microprocessor, controller, or chip. In this case, information for implementation (eg, information on instructions) or an algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VOD service providing apparatus, an Over the top (OTT) video apparatus, an Internet streaming service providing apparatus, a three-dimensional (3D) video apparatus, a virtual reality (VR) apparatus, an augmented reality (AR) apparatus, a teleconference video apparatus, a transportation user equipment (e.g., vehicle (including autonomous vehicles) user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the embodiment(s) present disclosure is applied may be produced in the form of a program that is to be executed by a computer and may be stored in a computer-readable recording medium. Multimedia data having a data structure according to the embodiment(s) of the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiment(s) of the present disclosure may be implemented with a computer program product according to program codes, and the program codes may be performed in a computer by the embodiment(s) of the present disclosure. The program codes may be stored on a carrier which is readable by a computer.

Figure 21:
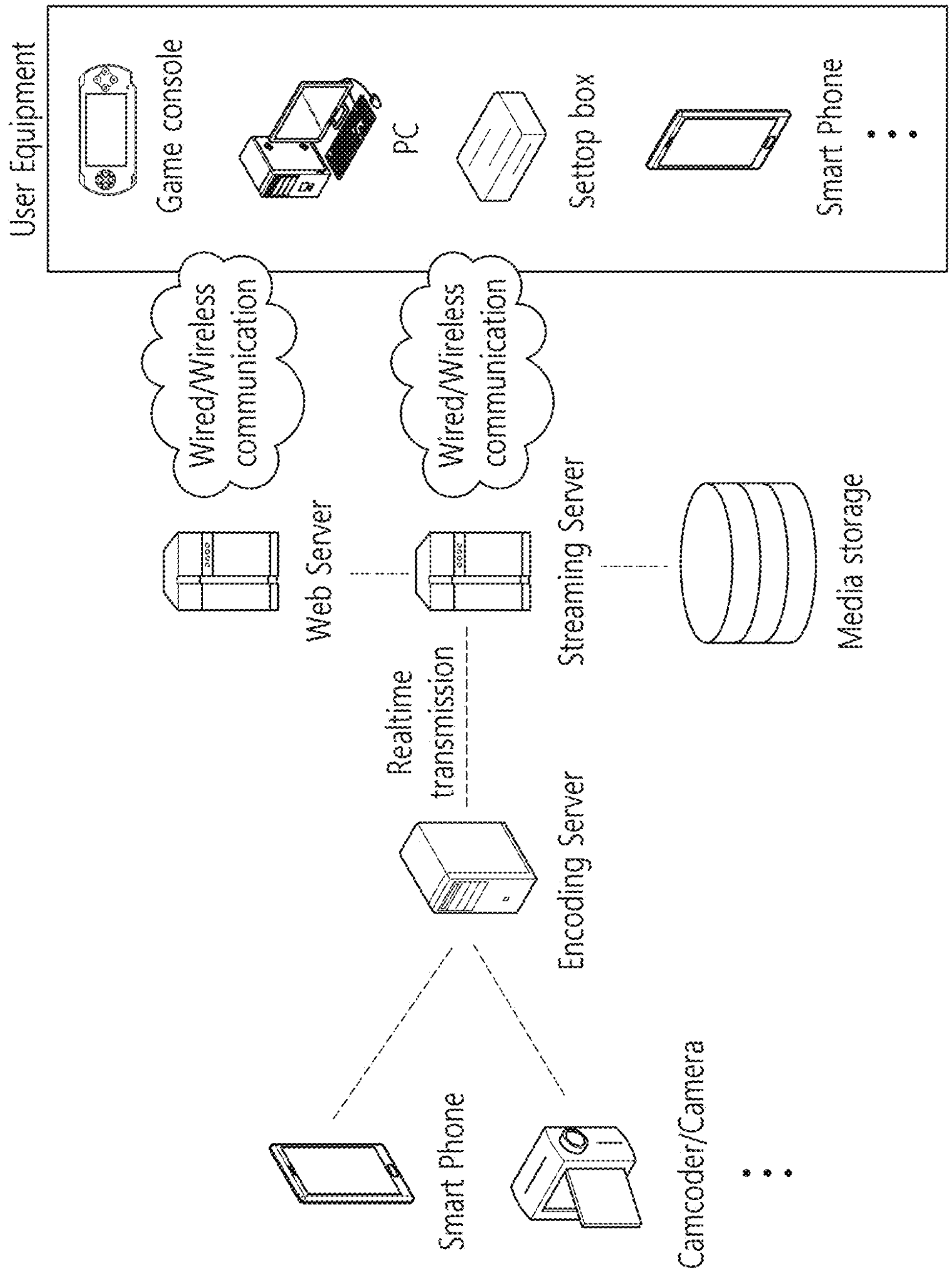
FIG. 21 illustrates a structural diagram of a contents streaming system to which the present document may be applied.

FIG. 21 illustrates an example of a content streaming system to which embodiments disclosed in the present document may be applied.

Referring to FIG. 21, a content streaming system to which embodiments of the present document may be applied may broadly include an encoding server, a streaming server, a web server, media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment (s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like.

Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding method performed by a decoding apparatus, the image decoding method comprising:

obtaining geometric partitioning mode (GPM) related information for a current block from a bitstream;

deriving partitions of the current block based on partition index information in the GPM related information, wherein the partitions include a first geometric partition and a second geometric partition;

deriving first prediction samples for the first geometric partition;

deriving second prediction samples for the second geometric partition;

generating prediction samples for the current block based on the first prediction samples and the second prediction samples; and generating reconstructed samples based on the prediction samples for the current block, wherein the image decoding method further comprises determining whether an intra prediction is allowed to be applied to one of the first geometric partition or the second geometric partition, wherein the obtaining the GPM related information comprises:

parsing first intra GPM flag information specifying whether the first geometric partition is coded by the intra prediction based on a determination that the intra prediction is allowed to be applied to one of the first geometric partition or the second geometric partition, and wherein based on a value of the first intra GPM flag information being equal to 1, an inter prediction is applied to the second geometric partition.

2. The image decoding method of claim 1, wherein based on the intra prediction being applied to the first geometric partition, the inter prediction is applied to the second geometric partition.

3. The image decoding method of claim 2, wherein based on the value of the first intra GPM flag information being equal to 1, second intra GPM flag information specifying whether the second geometric partition is coded by the intra prediction is not parsed.

4. The image decoding method of claim 1, wherein the obtaining the GPM related information comprises:

parsing second intra GPM flag information specifying whether the second geometric partition is coded by the intra prediction, based on a value of specific flag information not being equal to 1 and the value of the first intra GPM flag information not being equal to 1, wherein based on the value of the first intra GPM flag information being equal to 0, and a slice type of a current slice being equal to P slice, the value of the specific flag information is derived as equal to 1, and wherein based on the value of the first intra GPM flag information being equal to 1, the value of the specific flag information is derived as equal to 0.

5. The image decoding method of claim 4, wherein based on the second intra GPM flag information not being parsed, based on a first case that it is determined that the intra prediction is not allowed to be applied to one of the first geometric partition or the second geometric partition, a value of the second intra GPM flag information is derived as equal to 0, based on a second case that, other than the first case, the value of the first intra GPM flag information is equal to 1, the value of the second intra GPM flag information is derived as equal to 0, based on a third case that, other than the first case and the second case, the value of the specific flag information is equal to 1, the value of the second intra GPM flag information is derived as equal to 0, and based on a case other than the first case, the second case and the third case, the value of the second intra GPM flag information is derived as equal to 0.

6. The image decoding method of claim 1, wherein the obtaining the GPM related information comprises:

parsing second intra GPM flag information specifying whether the second geometric partition is coded by the intra prediction, based on a value of specific flag information not being equal to 1 and the value of the first intra GPM flag information not being equal to 1, wherein based on the value of the first intra GPM flag information being equal to 0, and a maximum number of GPM merge candidates being less than 2, the value of the specific flag information is derived as equal to 1, and wherein based on the value of the first intra GPM flag information being equal to 1, the value of the specific flag information is derived as equal to 0.

7. The image decoding method of claim 6, wherein based on the second intra GPM flag information not being parsed, based on a first case that it is determined that the intra prediction is not allowed to be applied to one of the first geometric partition or the second geometric partition, a value of the second intra GPM flag information is derived as equal to 0, based on a second case that, other than the first case, the value of the first intra GPM flag information is equal to 1, the value of the second intra GPM flag information is derived as equal to 0, based on a third case that, other than the first case and the second case, the value of the specific flag information is equal to 1, the value of the second intra GPM flag information is derived as equal to 0, and based on a case other than the first case, the second case and the third case, the value of the second intra GPM flag information is derived as equal to 0.

8. The image decoding method of claim 1, wherein based on the value of the first intra GPM flag information being equal to 1, the GPM related information includes first merge GPM index information related to a first merge candidate for the GPM.

9. The image decoding method of claim 1, wherein based on a value of second intra GPM flag information being equal to 0 and a maximum number of GPM merge candidates being greater than 2, the GPM related information includes second merge GPM index information related to a second merge candidate for the GPM.

10. The image decoding method of claim 1, wherein based on the value of the first intra GPM flag information being equal to 1, and a maximum number of GPM merge candidates being greater than 1, the GPM related information includes second merge GPM index information related to a second merge candidate for the GPM.

11. The image decoding method of claim 1, wherein as an intra prediction mode for the intra prediction applied to one of the first geometric partition or the second geometric partition, an intra prediction mode derived based on Template based Intra Mode Derivation (TIMD) is used.

12. The image decoding method of claim 11, wherein the intra prediction mode derived based on the TIMD is an intra prediction mode of the current block derived based on a template, wherein the template comprises neighboring samples of the current block, and wherein the neighboring samples are reconstructed samples.

13. An image encoding method performed by an encoding apparatus, the image encoding method comprising:

deriving partitions for applying geometric partitioning mode (GPM) for a current block, wherein the partitions include a first geometric partition and a second geometric partition;

deriving first prediction samples for the first geometric partition;

deriving second prediction samples for the second geometric partition;

generating prediction samples for the current block based on the first prediction samples and the second prediction samples;

generating GPM related information for the current block; and encoding image information including the GPM related information, wherein the image encoding method further comprises determining whether an intra prediction is allowed to be applied to one of the first geometric partition or the second geometric partition, wherein based on a determination that the intra prediction is allowed to be applied to one of the first geometric partition or the second geometric partition, the GPM related information includes first intra GPM flag information specifying whether the first geometric partition is coded by the intra prediction, and wherein based on a value of the first intra GPM flag information being equal to 1, an inter prediction is applied to the second geometric partition.

14. A non-transitory computer readable digital storage medium storing a bitstream generated by the image encoding method of claim 13.

15. A transmission method of data for an image, the transmission method comprising:

obtaining a bitstream, wherein the bitstream is generated based on deriving partitions for applying geometric partitioning mode (GPM) for a current block, wherein the partitions include a first geometric partition and a second geometric partition, deriving first prediction samples for the first geometric partition, deriving second prediction samples for the second geometric partition, generating prediction samples for the current block based on the first prediction samples and the second prediction samples, generating GPM related information for the current block and generating the bitstream by encoding image information including the GPM related information; and transmitting the data comprising the bitstream, wherein an intra prediction is applied to one of the first geometric partition or the second geometric partition, wherein the GPM related information includes first intra GPM flag information specifying whether the first geometric partition is coded by the intra prediction, and wherein based on a value of the first intra GPM flag information being equal to 1, an inter prediction is applied to the second geometric partition.

* * * * *